(12) United States Patent
Lee et al.

(10) Patent No.: US 9,280,244 B2
(45) Date of Patent: Mar. 8, 2016

(54) TOUCH UNIT ARRAY AND A DISPLAY PANEL HAVING THE SAME

(71) Applicant: AU Optronics Corporation, Hsin-Chu (TW)

(72) Inventors: Chia-Chi Lee, Hsin-Chu (TW); Wei-Jou Cheng, Hsin-Chu (TW); Yo-Fu Weng, Hsin-Chu (TW); Che-Chia Hsu, Hsin-Chu (TW); Ying-Chi Lu, Hsin-Chu (TW); Seok-Lyul Lee, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/177,410

(22) Filed: Feb. 11, 2014

(65) Prior Publication Data

US 2014/0253499 A1    Sep. 11, 2014

(30) Foreign Application Priority Data

Mar. 7, 2013    (TW) .............................. 102108076 A

(51) Int. Cl.
*G06F 3/045*    (2006.01)
*G06F 3/044*    (2006.01)

(52) U.S. Cl.
CPC ...... *G06F 3/044* (2013.01); *G06F 2203/04103* (2013.01); *G06F 2203/04111* (2013.01)

(58) Field of Classification Search
CPC ......... G06F 3/041; G06F 3/044; G06F 3/045; G06K 11/06; G08C 21/00

USPC ..................... 345/173–176; 178/18.01–18.06
See application file for complete search history.

(56) References Cited

U.S. PATENT DOCUMENTS

| | | | |
|---|---|---|---|
| 8,269,743 B2 * | 9/2012 | Kuo et al. ...................... | 345/174 |
| 2009/0213090 A1 * | 8/2009 | Mamba et al. ................ | 345/174 |
| 2010/0045614 A1 * | 2/2010 | Gray et al. ..................... | 345/173 |
| 2011/0141040 A1 * | 6/2011 | Kang et al. .................... | 345/173 |
| 2011/0169783 A1 * | 7/2011 | Wang et al. .................... | 345/176 |
| 2012/0068964 A1 | 3/2012 | Wright et al. | |
| 2012/0169651 A1 | 7/2012 | Chang | |
| 2012/0169655 A1 * | 7/2012 | Chang ........................... | 345/174 |
| 2012/0229414 A1 * | 9/2012 | Ellis ............................... | 345/174 |
| 2013/0257786 A1 * | 10/2013 | Brown et al. ................. | 345/174 |

FOREIGN PATENT DOCUMENTS

| | | |
|---|---|---|
| CN | 102467305 | 5/2012 |
| CN | 102541370 | 7/2012 |

* cited by examiner

*Primary Examiner* — Pegeman Karimi
(74) *Attorney, Agent, or Firm* — WPAT, PC; Justin King

(57) ABSTRACT

A touch unit array including a plurality of first strip electrodes, a plurality of second strip electrodes, and a plurality of electrode pad units is provided. Each first strip electrode has at least one first opening. The second strip electrodes are orthogonally arranged to the plurality of first strip electrodes. Each electrode pad unit includes at least one electrode pad, and the electrode pads are respectively disposed in the plurality of first openings, wherein each electrode pad unit receives a first driving signal.

13 Claims, 19 Drawing Sheets

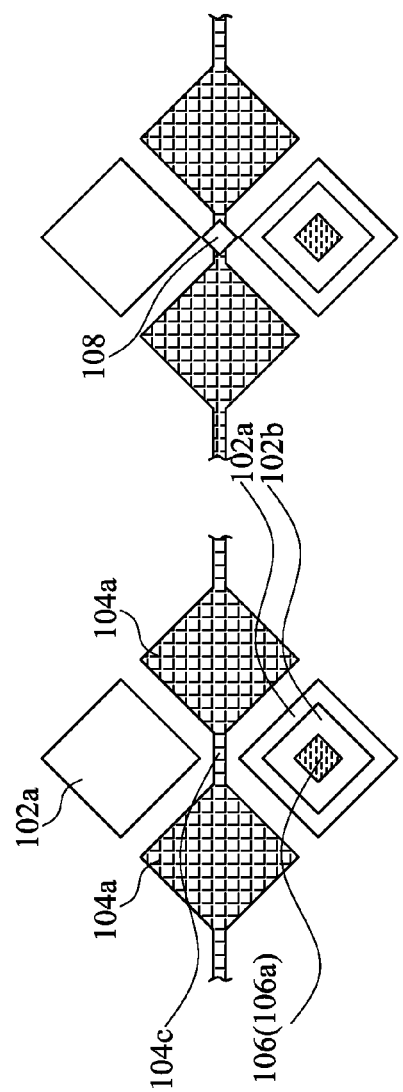

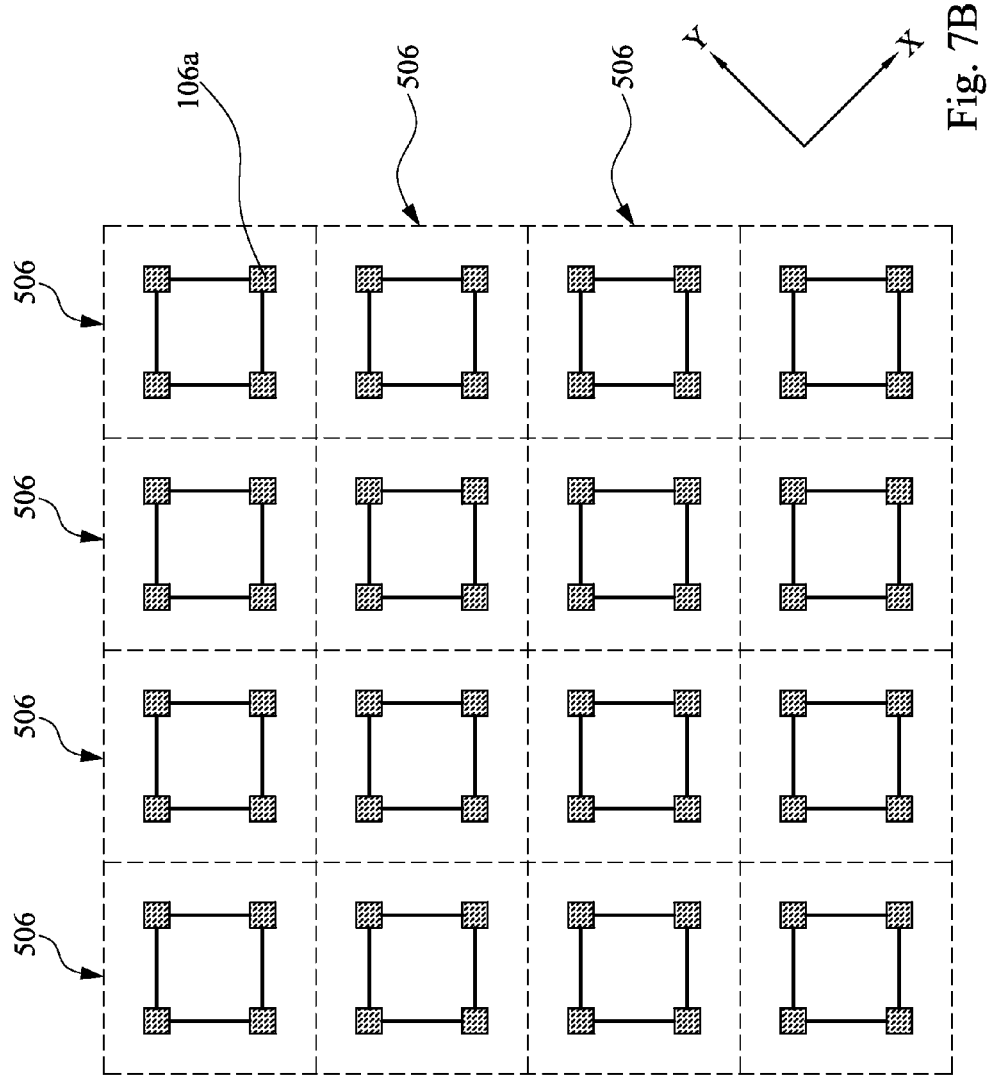

TOUCH UNIT ARRAY AND A DISPLAY PANEL HAVING THE SAME

RELATED APPLICATIONS

This application claims priority to Taiwan Application Serial Number 102108076, filed Mar. 7, 2013, which is herein incorporated by reference.

BACKGROUND

1. Technical Field

The present disclosure relates to a touch unit array, and more particularly, to a touch unit array with integrated touch technologies.

2. Description of Related Art

Capacitive touch unit array is an inputting device by utilizing electrons from a touching object, e.g. a finger, to input data. When the touching object touches or slides over a spot of the touch unit array, the capacitance of the spot of the touch unit array varies accordingly. By detecting the signals generated from the variation of the capacitance, the touched spot can be located. Capacitive touch unit array is applied in a variety of electronic products because of the thin thickness. The capacitive devices in the touch unit array can be classified as mutual capacitance devices and self capacitance devices. Both devices are capable of locating the touching spot based on processing of the signals therefrom.

Mutual capacitance devices utilize the capacitance coupling between the touching object and the touched spot on the touch unit array to reduce the capacitance of the electrodes around the touched spot. Therefore, the electrons around the touched spot are released and being detected so as to locate the touched spot. For example, sequential driving is performed by the driving lines (such as X-axis), and the sensor signal is detected by whole sensing or sequential sensing performed by the sensing lines (such as Y-axis), such that the position of the touched spot can be located.

On the other hand, a self capacitance device directly senses the capacitance coupling between the touching object and the self capacitance device on the touch unit array, and is coped with scan lines to perform X-axis and Y-axis scanning. By calculating the signals detected by scan lines in X-axis and Y-axis, the position of the touched spot can be located.

Nowadays the majority of touch panels in the market adopts the mutual capacitance devices as the touching signal processing of the touch unit array. However, as aforementioned, the mutual capacitance devices may not be capable of sensing the touch signal when the touching object is relatively distant from the touch unit array. As such, the decrease in capacitance between the electrodes around the touched spot may not be detected when the touching object is not close enough to the touch unit array. Accordingly, improvements in structures of the capacitive touch unit arrays continue to be sought.

SUMMARY

The present disclosure relates to a touch unit array integrated both mutual capacitance devices and self capacitance devices. Accordingly, the touch unit array provided in the present disclosure is capable to utilize both touch sensing devices with different sensing methods (mutual capacitance devices or self capacitance devices, for example). The touch sensing signals generated by the touching object can be detected regardless the touching object is relatively close to or relatively distant from the touch unit array.

The present disclosure, in one aspect, relates to a touch unit array includes a plurality of first strip electrodes, a plurality of second strip electrodes, and a plurality of electrode pad units. Each first strip electrode has at least one first opening. The second strip electrodes are orthogonally arranged to the first strip electrodes. Each electrode pad unit includes at least one electrode pad, and the electrode pads are disposed in the plurality of first opening respectively, wherein each electrode pad unit receives a first driving signal.

In one embodiment of the present disclosure, the first driving signal includes a waveform signal.

In one embodiment of the present disclosure, the waveform signal is a sine wave, a cosine wave, a square wave, a triangular wave, or a sawtooth wave.

In one embodiment of the present disclosure, the extending direction of the plurality of first strip electrodes is orthogonal to the extending direction of the plurality of second strip electrodes.

In one embodiment of the present disclosure, each first strip electrode includes a plurality of first electrode pads, each second strip electrode comprises a plurality of second electrode pads, and at least one of the first electrode pads has the first opening.

In one embodiment of the present disclosure, the quantity of the first opening is greater than one, each second strip electrode has a plurality of second openings, each second electrode pad has the second opening, and the electrode pads are respectively disposed in the first openings and the second openings.

In one embodiment of the present disclosure, each electrode pad unit includes at least four electrode pads which are mutually electrically connected and respectively disposed in four adjacent first openings and second openings.

In one embodiment of the present disclosure, each electrode pad unit includes two electrode pads which are mutually electrically connected and respectively disposed in two adjacent first openings.

In one embodiment of the present disclosure, one of the electrode pad units includes a plurality of electrode pads which are mutually electrically connected and respectively disposed in the first openings in a straight line, another one of the electrode pad units comprises a plurality of electrode pads which are mutually electrically connected and respectively disposed in the second openings in another straight line.

In various embodiments of the present disclosure, the first strip electrodes respectively receive a second driving signal, and the second strip electrodes respectively output a detecting signal.

In one embodiment of the present disclosure, the first strip electrodes and the second strip electrodes are interlaced to form a plurality of overlapping patterns and a plurality of interspaces.

In one embodiment of the present disclosure, each first strip electrode includes a plurality of first electrode pad, each second strip electrode includes a plurality of second electrode pad, and at least one of the first electrode pads has the first opening.

In one embodiment of the present disclosure, an isolation layer disposed between the first strip electrode and the second strip electrode of the plurality of overlapping patterns is further included. The quantity of the first openings is greater than two. Each second strip electrode has a plurality of second opening, and each second electrode pad has the second opening. The electrode pads are respectively disposed in the first openings, the interspaces, and the second openings.

The present disclosure, in another aspect, relates to a touch unit array, including a plurality of first strip electrodes, a plurality of second strip electrodes, and a plurality of electrode pad units. The second strip electrodes are interlaced with the plurality of first strip electrodes to form a plurality of overlapping patterns and interspaces. Each electrode pad unit includes at least one electrode pad. The electrode pads are respectively disposed in the plurality of interspaces, wherein each of the electrode pad units receives a first driving signal.

The present disclosure, in another aspect, relates to a touch display panel, including a first substrate, a pixel array disposed on the first substrate, and the touch unit array disposed on the pixel array.

In one embodiment of the present disclosure, further includes a display medium, a color filter array, and a second substrate. The color filter array disposed between the touch unit array and the display medium. The second substrate is disposed between the touch unit array and the color filter array.

In another embodiment of the present disclosure, further includes a display medium, a second substrate, and a color filter array. The color filter array is disposed between the touch unit array and the display medium, and the touch unit array is disposed between the second substrate and the color filter array.

In another embodiment of the present disclosure, further includes a display medium, a second substrate, and a color filter array. The color filter array is disposed between the second substrate and the touch unit array.

BRIEF DESCRIPTION OF THE DRAWINGS

The disclosure may be more fully understood by reading the following detailed description of the embodiment, with reference made to the accompanying drawings as follows:

FIG. 1B is a top-view in an intermediate stage of manufacturing the touch unit array according to the first embodiment of the present disclosure;

FIG. 1C is a top-view of the touch unit array shown in FIG. 1B in a subsequent stage of manufacturing the touch unit array according to the first embodiment of the present disclosure;

FIG. 1D is a top-view of the touch unit array shown in FIG. 1C in a subsequent stage of manufacturing the touch unit array according to the first embodiment of the present disclosure;

FIG. 1E is a cross-sectional view of line AA' of the touch unit array shown in FIG. 1D;

FIG. 7B is a schematic view of the self capacitance devices of the touch unit array according to the fifth embodiment of the present disclosure;

DETAILED DESCRIPTION

Figure 1A:
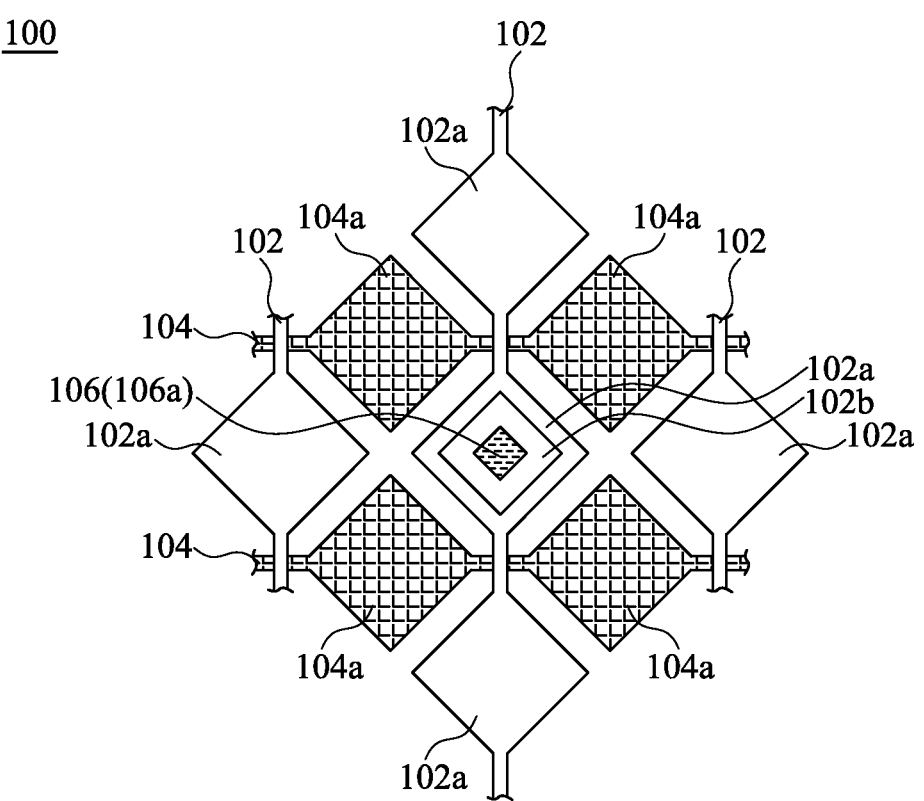
FIG. 1A is a schematic view of a portion of a touch unit array according to the first embodiment of the present disclosure.

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

As used herein, the singular forms "a," "an" and "the" include plural referents unless the context clearly dictates otherwise. Therefore, reference to, for example, a data sequence includes aspects having two or more such sequences, unless the context clearly indicates otherwise.

Reference will now be made in detail to the embodiments of the present disclosure, examples of which are illustrated in the accompanying drawings. Wherever possible, the same reference numbers are used in the drawings and the description to refer to the same or like parts.

Figure 2:
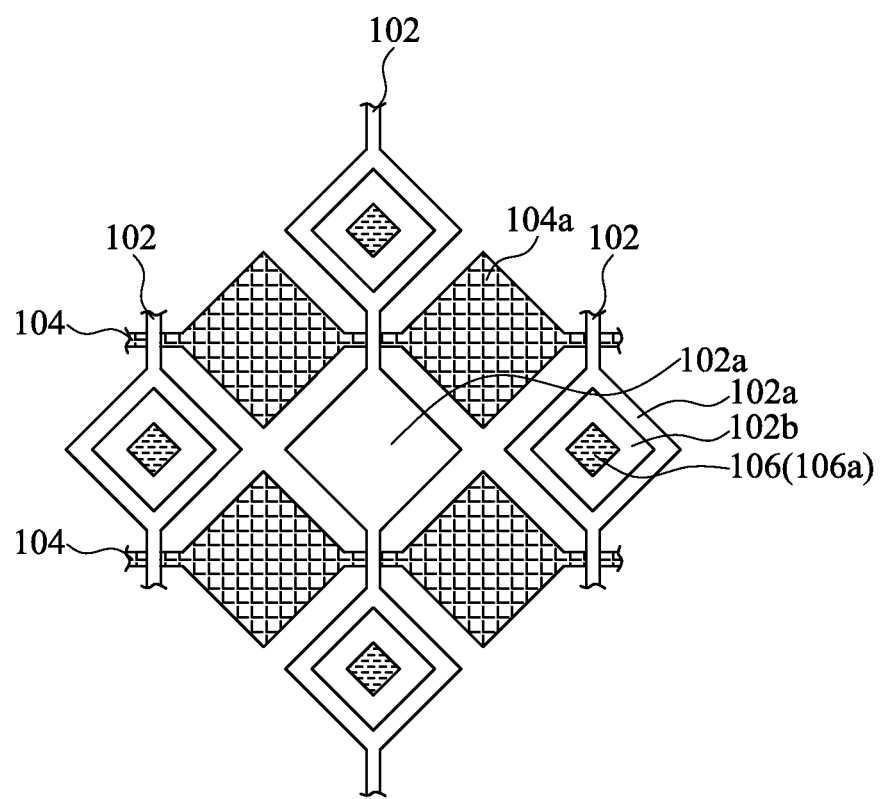
FIG. 2 is a schematic view of a portion of a touch unit array according to the second embodiment of the present disclosure.

Referring to FIG. 1A, FIG. 1A is a schematic view of a portion of a touch unit array 100 according to the first embodiment of the present disclosure. The touch unit array 100 includes a plurality of first strip electrodes 102, a plurality of second strip electrodes 104, and a plurality of electrode pad units 106. The first strip electrodes 102 and the second strip electrodes 104 are interlaced and electrically isolated with each other. The extending direction of the first strip electrodes 102 may be orthogonal to that of the second strip electrodes 104, however, the present disclosure is not limited thereto. As illustrated in FIG. 1A, each first strip electrode 102 includes a plurality of electrically connected first electrode pads 102a, and each second strip electrode 104 includes a plurality of electrically connected second electrode pads 104a, wherein at least one first electrode pad 102a has a first opening 102b. The fabricating sequence of each first strip electrode 102 and each second strip electrode 104 may be illustrated in FIG. 1B to FIG. 1E, wherein FIG. 1B to FIG. 1D are top-view, and FIG. 1E is a cross-sectional view. First, as shown in FIG. 1B, the first electrode pads 102a, the second electrode pads 104a, and connecting parts 104c are formed on the substrate 110. The connecting part 104c electrically connects adjacent second electrode pads 104a. An isolating part 108 is formed on the connecting part 104c, as shown in FIG. 1C. Then, a connecting part 102c is formed on the isolating part 108 to electrically connect adjacent first electrode pads 102a. Therefore, the first strip electrode 102 including electrically connected first electrode pads 102a, and the second strip electrode 104 including electrically connected second electrode pads 104a are fabricated as shown in FIG. 1D. FIG. 1E is the cross-sectional view of line AA' of FIG. 1D. As shown in FIG. 1E, the isolating part 108 is disposed between the connecting part 104c and the connecting part 102c. The fabricating sequence of each first strip electrode 102 and each second strip electrode 104 illustrated in FIG. 1B to FIG. 1E is merely an example to illustrate that the first strip electrode 102 and the second strip electrode 104 are interlaced and electrically isolated with each other, however, the present disclosure is not limited thereto. Besides, for clearance of drawings of the present disclosure, the substrate 110, the connecting parts 102c, 104c, and the isolating part 108 shown in aforementioned FIG. 1B to FIG. 1E are not repeatedly illustrated and labeled in other figures of the present disclosure. As the partial view of the present embodiment shown in FIG. 1A, the first electrode pad 102a in the middle of FIG. 1A has a first opening 102b, and the first electrode pad 102a having the first opening 102b is surrounded by the first electrode pads 102a and the second electrode pads 104a without openings. It should be noticed that an electrode pad 106a is disposed in the opening 102b, and the electrode pad 106a is electrically isolated to the first electrode pad 102a with the first opening 102b. Therefore, the electrode pad 106a receives a first driving signal independently and would not be affected by the first strip electrode 102 with the first opening 102b, while the first strip electrode 102 receives a second driving signal. In the present embodiment, single electrode pad 106a is an electrode pad unit 106. The touch unit array 100 including a plurality of first strip electrodes 102, a plurality of second strip electrodes 104, and a plurality of electrode pad units 106 is constructed as analogized by the portion illustrated in FIG. 1A. In the touch unit array 100, the first electrode pad 102a of the first strip electrode 102 and the second electrode pad 104a of the second strip electrode 104 construct the mutual capacitance device of the present embodiment. That is, the first electrode pad 102a and the second electrode pad 104a adjacent to the first electrode pad 102a are one pair of mutual capacitance electrodes. On the other hand, the electrode pad unit 106 is the self capacitance device of the present embodiment. Each first strip electrode 102 receives a second driving signal therefore each first electrode pad 102a of each first strip electrode 102 possesses a voltage. When a touching object approaches, the second strip electrode 104 outputs a detecting signal which is produced by the capacitance difference between the first electrode pad 102a and the second electrode pad 104a. In other word, touching by the touching object reduces the capacitance between the first electrode pad 102a and the second electrode pad 104a and releases electrons stored, therefore released electrons can be detected and the position touched by the touching object can be detected. In detail, the first strip electrodes 102 illustrated in FIG. 1A are, for example, the driving lines extending along X-axis; the second strip electrodes 104 illustrated in FIG. 1A are, for example, the sensing lines extending along Y-axis. Sequential driving is performed by the driving lines (the first strip electrodes 102), and the point sensor signal is detected by whole sensing or sequential sensing performed by the sensing lines (the second strip electrodes 104). However, the present disclosure is not limited thereto. The first strip electrodes 102 could be the sensing lines, and the second strip electrodes 104 could be the driving lines accordingly. The mutual capacitance device of touch unit array 100, which is constructed by the first strip electrodes 102 and the second strip electrodes 104, may not be capable to sense the touch signal when the touching object is relatively distant from the touch unit array 100. Because the capacitance difference between the first electrode pad 102a and the second electrode pad 104a may not be obvious enough to be detected when the touching object is relatively distant from the touch unit array 100. In this case, the electrode pad units 106 of touch unit array 100 of the present disclosure are capable to compensate this issue. As aforementioned, the electrode pad unit 106 is the self capacitance device of the present embodiment. The self capacitance device senses the capacitance generated between the touching object and itself, and is coped with scan lines to perform X-axis and Y-axis scanning. The touching position is located by calculating the signals detected by scan lines in X-axis and Y-axis. The sensing method of the self capacitance device is different form that of the mutual capacitance device. In the mutual capacitance device, sensing signals are generated by breaking the capacitance between the pair of mutual capacitance electrodes; in the self capacitance device, sensing signals are generated by detecting the capacitance variation between the touching object and itself, and therefore the self capacitance device can perform effective touch signals sensing even the touching object is relatively distant from the self capacitance device. In the present embodiment, each electrode pad unit 106 (each electrode pad 106a) receives a first driving signal. The first driving signal may be a waveform signal. For example, the waveform signal may be a sine wave, a cosine wave, a square wave, a triangular wave, or a sawtooth wave. However, the present disclosure is not limited thereto. In summary, the touch unit array 100 is integrated both mutual capacitance devices and self capacitance devices. Accordingly, the touch unit array 100 is capable to utilize both touch sensing devices with different sensing methods. By the coping with both mutual capacitance devices and self capacitance devices, the touch sensing signals generated by the touching object can be detected regardless the touching object is relatively close to or relatively distant from the touch unit array 100. Referring to FIG. 2, FIG. 2 is a schematic view of a portion of a touch unit array 200 according to the second embodiment of the present disclosure. The touch unit array 200 also includes a plurality of first strip electrodes 102, a plurality of second strip electrodes 104, and a plurality of electrode pad units 106. As illustrated in FIG. 2, each first strip electrode 102 includes a plurality of electrically connected first electrode pads 102a, and each second strip electrode 104 includes a plurality of electrically connected second electrode pads 104a, wherein at least one first electrode pad 102a has a first opening 102b. The positions of above elements and the connections between them are similar to those of the first embodiment of the present disclosure, and therefore the details are omitted here. It should be noticed that, which is different from that illustrated in FIG. 1A, the first electrode pad 102a in the middle of the portion of a touch unit array 200 illustrated in FIG. 2 dose not have the first opening 102b, however, the first electrode pads 102a surrounding the middle first electrode pad 102a of the portion of a touch unit array 200 illustrated in FIG. 2 have the first openings 102b respectively. Similarly, each second electrode pad 104a also does not have openings. The electrode pads 106a are respectively disposed in the first openings 102b, and the electrode pads 106a are electrically isolated to the first electrode pads 102a. Therefore, each electrode pad 106a receives the first driving signal independently, and does not affected by the second driving signal which is received by the first strip electrodes 102. In the second embodiment, single electrode pad 106a is also an electrode pad unit 106. The touch unit array 200 including a plurality of first strip electrodes 102, a plurality of second strip electrodes 104, and a plurality of electrode pad units 106 is constructed as analogized by the portion illustrated in FIG. 2. In the touch unit array 200, the first electrode pad 102a of the first strip electrode 102 and the second electrode pad 104a of the second strip electrode 104 also construct the mutual capacitance device of the second embodiment. That is, the first electrode pad 102a and the second electrode pad 104a adjacent to the first electrode pad 102a are one pair of mutual capacitance electrodes. On the other hand, the electrode pad unit 106 is also the self capacitance device of the second embodiment. Each first strip electrode 102 receives a second driving signal. Therefore each first electrode pad 102a of each first strip electrode 102 possesses a voltage. The driving method and the principle of operation of the second embodiment are similar to those of the first embodiment, and therefore the details are omitted here. Comparing to the touch unit array 100 illustrated in FIG. 1A, the touch unit array 200 illustrated in FIG. 2 has higher density of the self capacitance devices (the electrode pad units 106); therefore the touch sensing signals can be detected more precisely when the touching object is relatively distant from the touch unit array 200.

Referring to both FIG. 1A and FIG. 2, it should be understandable that the density of the self capacitance devices (electrode pads 106a), which are integrated to the mutual capacitance devices (the first electrode pads 102a of the first strip electrodes 102 and the second electrode pads 104a of the second strip electrode pads 104), can be adjusted and optimized according to various demands. That is, the schematic views of a portion of a touch unit array 100 and 200 according to the present disclosure are merely examples. Variety of patterns can be correspondingly designed for various demands.

Figure 3:
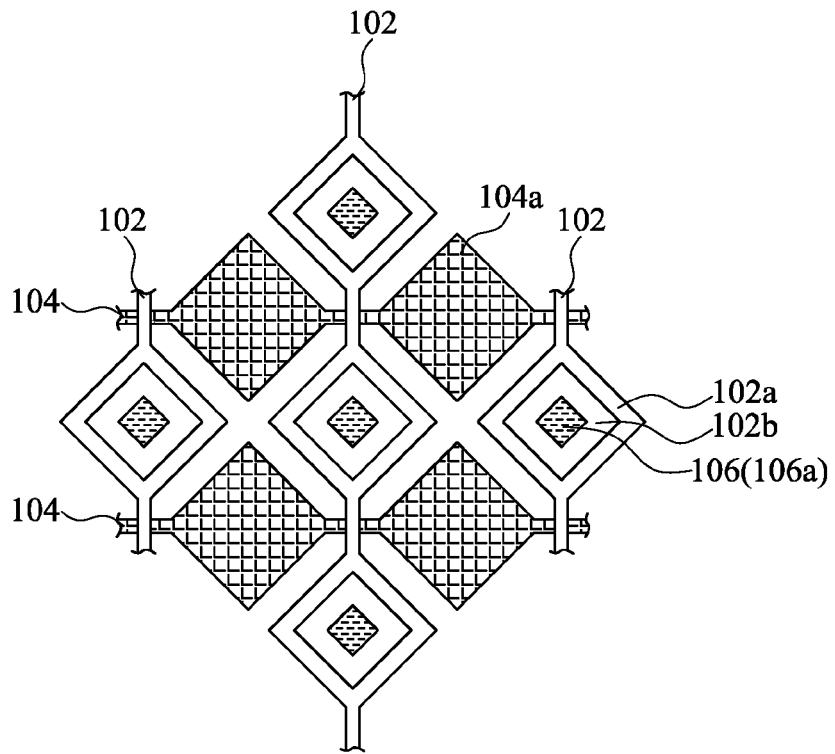
FIG. 3 is a schematic view of a portion of a touch unit array according to the third embodiment of the present disclosure.

Referring to FIG. 3, FIG. 3 is a schematic view of a portion of a touch unit array 300 according to the third embodiment of the present disclosure. The touch unit array 300 includes a plurality of first strip electrodes 102, a plurality of second strip electrodes 104, and a plurality of electrode pad units 106. The first strip electrodes 102 and the second strip electrodes 104 are interlaced and electrically isolated with each other. The extending direction of the first strip electrodes 102 may be orthogonal to that of the second strip electrodes 104. However, the present disclosure is not limited thereto. As illustrated in FIG. 3, each first strip electrode 102 includes a plurality of electrically connected first electrode pads 102a, and each second strip electrode 104 includes a plurality of electrically connected second electrode pads 104a, wherein at least one first electrode pad 102a has a first opening 102b. The positions of above elements and the connections between them are similar to those of the aforementioned embodiments of the present disclosure, and therefore the details are omitted here. It should be noticed that, which is different from those of aforementioned embodiments, all of the first electrode pads 102a have the first opening 102b respectively. As shown in FIG. 3, not only the first electrode pad 102a in the middle of the portion of a touch unit array 300 has the first opening 102b, but also the surrounding first electrode pads 102a have the first openings 102b respectively. Each second electrode pad 104a still does not have openings. The electrode pads 106a are disposed in the first openings 102b respectively, and are electrically isolated to the first electrode pads 102a. Therefore, each electrode pad 106a receives the first driving signal independently, and does not affected by the second driving signal, which is received by the first strip electrodes 102. In the third embodiment, single electrode pad 106a is also an electrode pad unit 106. The touch unit array 300 including the plurality of first strip electrodes 102, the plurality of second strip electrodes 104, and the plurality of electrode pad units 106 is constructed as analogized by the portion illustrated in FIG. 3.

In the touch unit array 300, the first electrode pad 102a of the first strip electrode 102 and the second electrode pad 104a of the second strip electrode 104 also construct the mutual capacitance device of the third embodiment. That is, the first electrode pad 102a and the second electrode pad 104a adjacent to the first electrode pad 102a are one pair of mutual capacitance electrodes. On the other hand, the electrode pad unit 106 is also the self capacitance device of the second embodiment. Each first strip electrode 102 receives a second driving signal. Therefore each first electrode pad 102a of each first strip electrode 102 possesses a voltage. The driving method and the principle of operation of the third embodiment are similar to those of the first embodiment, and therefore the details are omitted here. Comparing to the touch unit array 200 illustrated in FIG. 2, the touch unit array 300 illustrated in FIG. 3 has even higher density of the self capacitance devices (the electrode pad units 106); therefore the touch sensing signals can be detected much more precisely when the touching object is relatively distant from the touch unit array 300.

Figure 4:
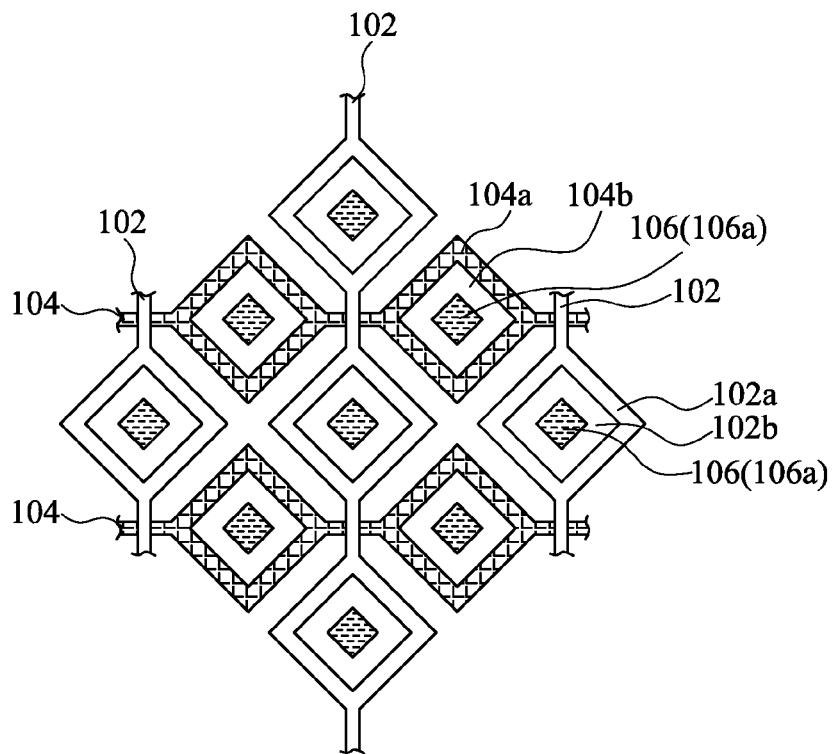
FIG. 4 is a schematic view of a portion of a touch unit array according to the fourth embodiment of the present disclosure.

Referring to FIG. 4, FIG. 4 is a schematic view of a portion of a touch unit array 400 according to the fourth embodiment of the present disclosure. The touch unit array 400 includes a plurality of first strip electrodes 102, a plurality of second strip electrodes 104, and a plurality of electrode pad units 106. The first strip electrodes 102 and the second strip electrodes 104 are interlaced and electrically isolated with each other. The extending direction of the first strip electrodes 102 may be orthogonal to that of the second strip electrodes 104; however, the present disclosure is not limited thereto. As illustrated in FIG. 4, each first strip electrode 102 includes a plurality of electrically connected first electrode pads 102a, and each second strip electrode 104 includes a plurality of electrically connected second electrode pads 104a. The positions of above elements and the connections between them are similar to those of the aforementioned embodiments of the present disclosure, and therefore the details are omitted here. It should be noticed that, which is different from those of aforementioned embodiments, all of the first electrode pads 102a have the first opening 102b respectively, and all of the second electrode pads 104a have the second opening 104b respectively. As shown in FIG. 4, in all of the first openings 102b and the second openings 104b, there is an electrode pads 106a. In other words, the electrode pads 106a are respectively disposed in all of the first openings 102b and the second openings 104b. The electrode pads 106a are electrically isolated to the first electrode pads 102a. Therefore, each electrode pad 106a receives the first driving signal independently, and does not affected by the second driving signal, which is received by the first strip electrodes 102 or the second strip electrodes 104. In the fourth embodiment, single electrode pad 106a is also an electrode pad unit 106. The touch unit array 400 including the plurality of first strip electrodes 102, the plurality of second strip electrodes 104, and the plurality of electrode pad units 106 is constructed as analogized by the portion illustrated in FIG. 4.

In the touch unit array 400, the first electrode pad 102a of the first strip electrode 102 and the second electrode pad 104a of the second strip electrode 104 also construct the mutual capacitance device of the fourth embodiment. Each first electrode pad 102a receives a second driving signal; therefore each first electrode pad 102a of each first strip electrode 102 possesses a voltage. The driving method and the principle of operation of the fourth embodiment are similar to those of the first embodiment, and therefore the details are omitted here. In summary, the touch unit array 400 is also a touch unit array integrated both mutual capacitance devices and self capacitance devices. Accordingly, the touch unit array 100 is capable to utilize both touch sensing devices with different sensing methods. By the coping with both mutual capacitance devices and self capacitance devices, the touch sensing signals generated by the touching object can be detected regardless the touching object is relatively close to or relatively distant from the touch unit array 400. Comparing to the touch unit array 300 illustrated in FIG. 3, the touch unit array 400 illustrated in FIG. 4 has even higher density of the self capacitance devices (the electrode pad units 106), therefore the touch sensing signals can be detected much more precisely when the touching object is relatively distant from the touch unit array 400.

Referring to FIG. 1A to FIG. 4, it should be comprehensible that the density of the self capacitance devices (electrode pads 106a), which are integrated to the mutual capacitance devices (the first electrode pads 102a of the first strip electrodes 102 and the second electrode pads 104a of the second strip electrode pads 104), can be adjusted and optimized according to various demands. According to the touch unit array 100, 200, 300, and 400 of the present disclosure, each of the plurality of electrode pad units 106 merely includes an electrode pad 106a. That is, each of the electrode pads 106a disposed in the first openings 102b or the second openings 104b itself is the electrode pad unit 106.

Figure 5:
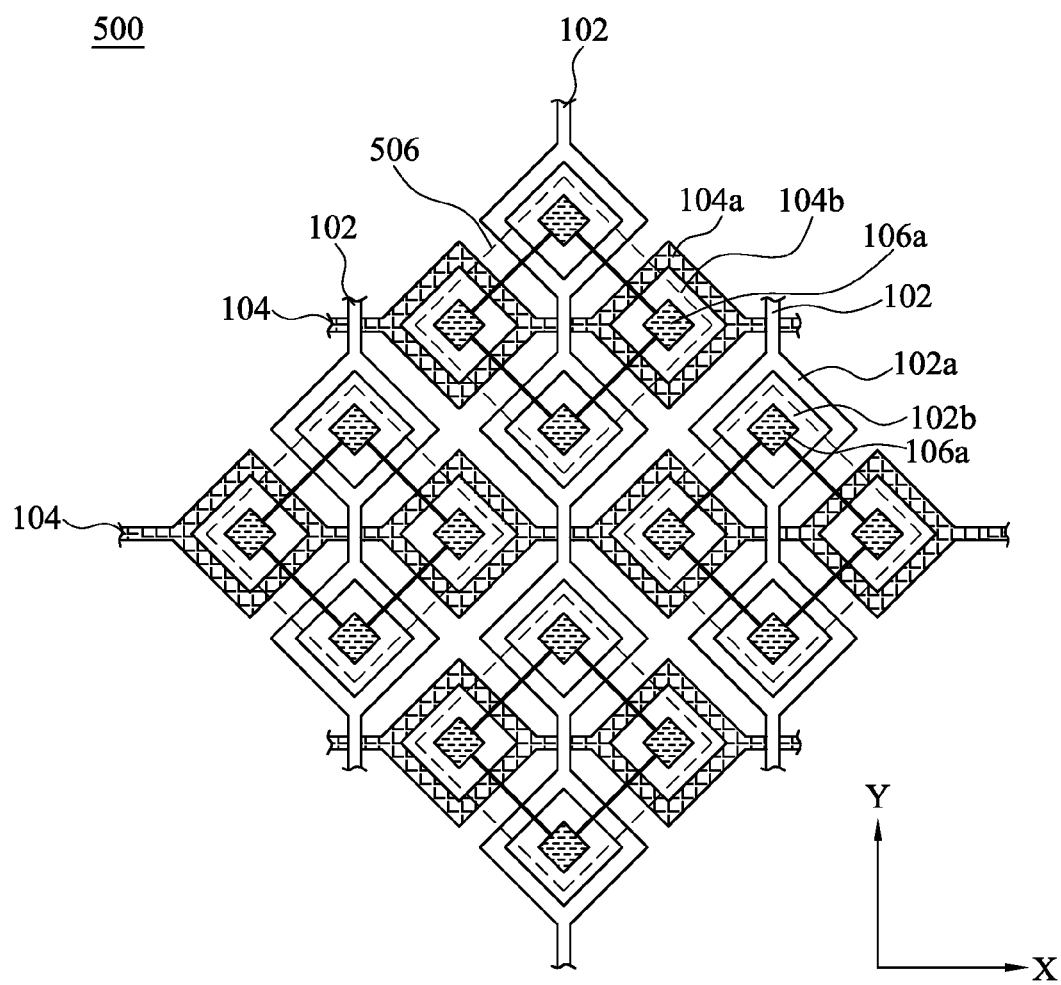
FIG. 5 is a schematic view of a portion of a touch unit array according to the fifth embodiment of the present disclosure.

Referring to FIG. 5, FIG. 5 is a schematic view of a portion of a touch unit array 500 according to the fifth embodiment of the present disclosure. The touch unit array 500 includes a plurality of first strip electrodes 102, a plurality of second strip electrodes 104, and a plurality of electrode pad units 506. The first strip electrodes 102 and the second strip electrodes 104 are interlaced and electrically isolated with each other. The extending direction of the first strip electrodes 102 may be orthogonal to that of the second strip electrodes 104. However, the present disclosure is not limited thereto. As illustrated in FIG. 5, each first strip electrode 102 includes a plurality of electrically connected first electrode pads 102a, and each second strip electrode 104 includes a plurality of electrically connected second electrode pads 104a. The positions of above elements and the connections between them are similar to those of the aforementioned embodiments of the present disclosure, and therefore the details are omitted here. It should be noticed that, which is different from those of aforementioned embodiments, each electrode pad unit 506 includes four electrode pads 106a which are mutually electrically connected and respectively disposed in four adjacent first openings 102a and second openings 104b. In other words, each of the plurality of the electrode pad units 506 of the touch unit array 500 according to the fifth embodiment of the present disclosure includes four electrode pads 106a which are electrically connected with each other by four connecting parts or bridges (not marked), for example. Therefore, the pattern of the electrode pad units 506 of the fifth embodiment of the present disclosure is different from that of the electrode pad units 106 of the aforementioned embodiments of the present disclosure. However, the present disclosure is not limited thereto. Practically, the electrode pad units 506 may also include four or more electrode pads 106a formed into a matrix, for example, six (2×3), eight (2×4), nine (3×3), ten (2×5), and twelve (3×4 or 2×6) electrode pads 106a may also be included in one electrode pad units 506.

Figure 6C:
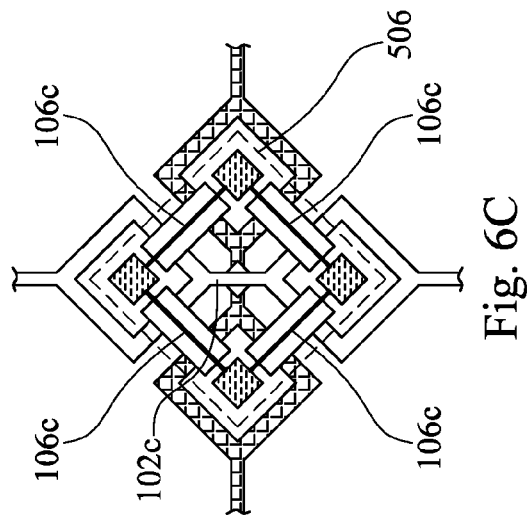
FIG. 6C is a top-view of the touch unit array shown in FIG. 6B in a subsequent stage of manufacturing the touch unit array according to the fifth embodiment of the present disclosure.
Figure 6B:
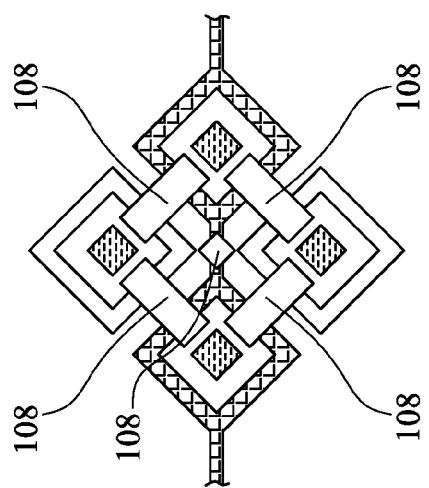
FIG. 6B is a top-view of the touch unit array shown in FIG. 6A in a subsequent stage of manufacturing the touch unit array according to the fifth embodiment of the present disclosure.
Figure 6A:
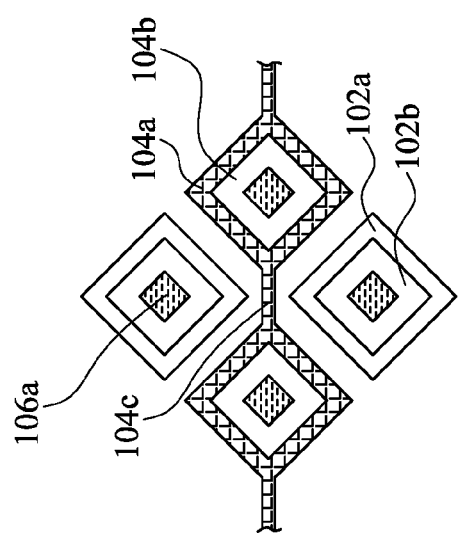
FIG. 6A is a top-view in an intermediate stage of manufacturing the touch unit array according to the fifth embodiment of the present disclosure.

As illustrated in FIG. 5, each first electrode pad 102a has the first opening 102b; and each second electrode pad 104a has the second opening 104b. The electrode pads 106a are respectively disposed in all of the first openings 102b and the second openings 104b. The electrode pads 106a are electrically isolated to the first electrode pads 102a and the second electrode pad 104a. And four electrode pads 106a, which are respectively disposed in four adjacent first openings 102b and second openings 104b, are mutually electrically connected and construct the electrode pad units 506. The fabricating sequence of each first strip electrode 102, each second strip electrode 104, and each electrode pad units 506 may be illustrated in FIG. 6A to FIG. 6C, wherein FIG. 6A to FIG. 6C are all top-views. First, as shown in FIG. 6A, the first electrode pads 102a having the first openings 102b, the second electrode pads 104a having the second openings 104b, the electrode pads 106a respectively disposed in the first openings 102b and the second openings 104b, and connecting parts 104c are formed. The connecting part 104c electrically connects adjacent second electrode pads 104a. As illustrated in FIG. 6B, a plurality of isolating parts 108 are formed on the connecting part 104c and parts of the first electrode pads 102a and the second electrode pads 104a. Then, a connecting part 102c and a plurality of connecting part 106c are formed on the isolating part 108 to electrically connect adjacent first electrode pads 102 and four adjacent first electrode pads 102a. Therefore, the first strip electrode 102 including electrically connected first electrode pads 102a, the second strip electrode 104 including electrically connected second electrode pads 104a, and the electrode pad unit 506 are fabricated as shown in FIG. 6C. For clearance of drawings of the present disclosure, the connecting part 102c, 104c, 106c and the isolating part 108 shown in aforementioned FIG. 6A to FIG. 6C are not repeatedly illustrated and labeled in other figures of the present disclosure.

Accordingly, the touch unit array 500 including the plurality of first strip electrodes 102, the plurality of second strip electrodes 104, and the plurality of electrode pad units 506 is constructed as analogized by the portion illustrated in FIG. 5.

Figure 7A:
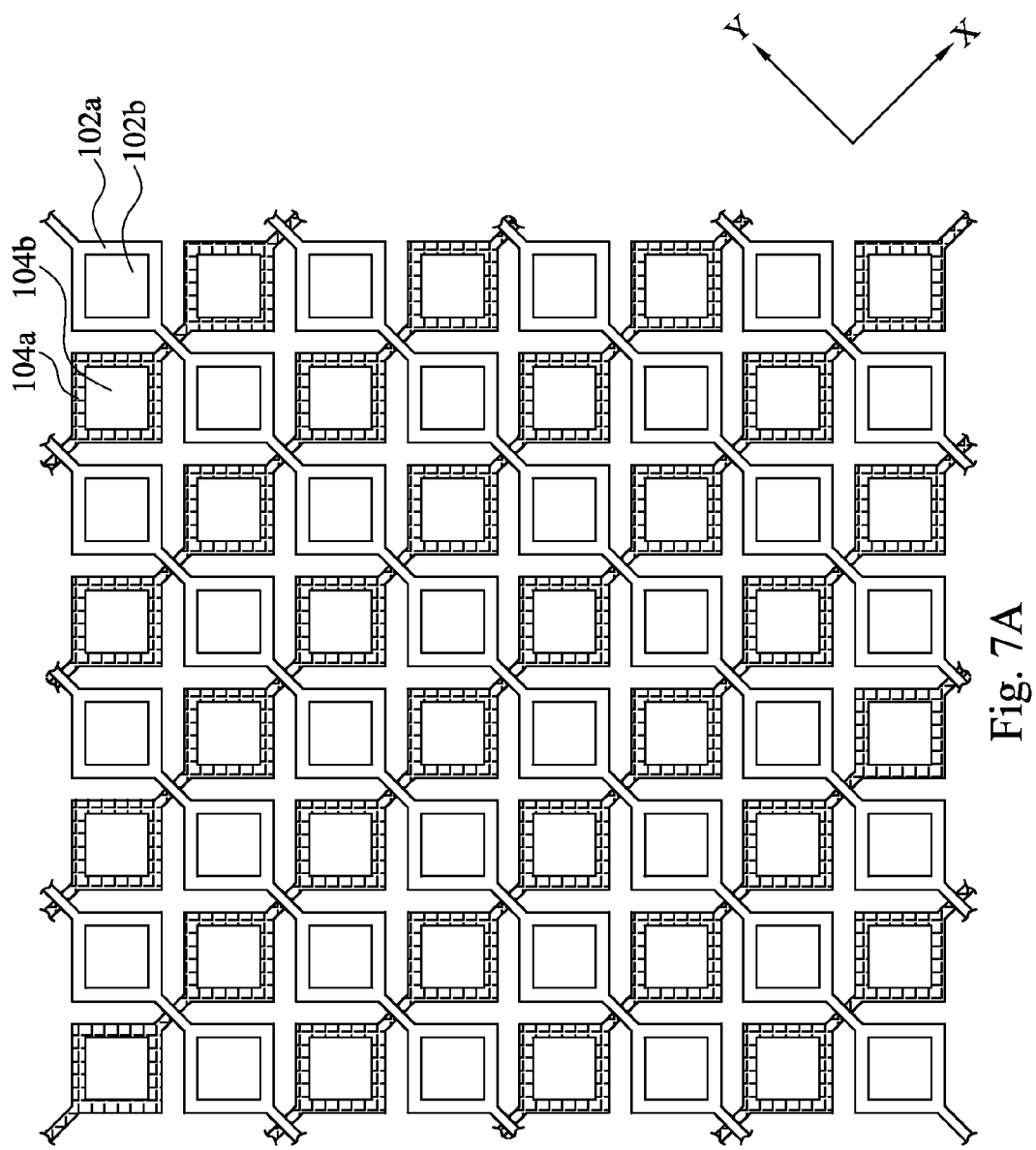
FIG. 7A is a schematic view of the mutual capacitance devices of the touch unit array according to the fifth embodiment of the present disclosure.

In the touch unit array 500, the first electrode pad 102a of the first strip electrode 102 and the second electrode pad 104a of the second strip electrode 104 are the mutual capacitance device of the fifth embodiment. That is, the first electrode pad 102a and the second electrode pad 104a adjacent to the first electrode pad 102a are one pair of mutual capacitance electrodes. On the other hand, the electrode pad unit 506 is the self capacitance device of the fifth embodiment. Each first strip electrode 102 receives a second driving signal therefore each first electrode pad 102a of each first strip electrode 102 possesses a voltage. Each electrode pad unit 506 receives a first driving signal. The driving method and the principle of operation of the fifth embodiment are similar to those of the first embodiment, and therefore the details are omitted here. To be more specific, structures in FIG. 7A and FIG. 7B construct touch unit arrays 500 in FIG. 5. FIG. 7A is a schematic view of the mutual capacitance devices of the touch unit array 500 according to the fifth embodiment of the present disclosure; FIG. 7B is a schematic view of the self capacitance devices of the touch unit array 500 according to the fifth embodiment of the present disclosure. As shown in FIG. 7A, the first strip electrodes 102 are, for example, the driving lines extending along X-axis; the second strip electrodes 104 are, for example, the sensing lines extending along Y-axis. Sequential driving is performed by the driving lines (the first strip electrodes 102), and the point sensor signal is detected by whole sensing or sequential sensing performed by the sensing lines (the second strip electrodes 104), and the point sensor signal is detected by whole sensing or sequential sensing performed by the sensing lines (the second strip electrodes 104). But the present disclosure is not limited thereto. The first strip electrodes 102 could be the sensing lines, and the second strip electrodes 104 could be the driving lines accordingly. However, the mutual capacitance device of touch unit array 500, which is constructed by the first strip electrodes 102 and the second strip electrodes 104, may not be capable to sense the touch signal when the touching object is relatively distant from the touch unit array 500 because the capacitance difference between the first electrode pad 102a and the second electrode pad 104a may not be obvious enough to be detected when the touching object is relatively distant from the touch unit array 500. In this case, the electrode pad units 506 of touch unit array 500 of the present disclosure are capable to compensate this issue. Similar to aforementioned touch unit array 400, by the coping with both mutual capacitance devices and self capacitance devices, the touch sensing signals generated by the touching object can be detected regardless the touching object is relatively close to or relatively distant from the touch unit array 500.

Referring to FIG. 5 and FIG. 7B, the plurality of electrode pad units 506 is shown in FIG. 7B. In the touch unit array 500 according to the fifth embodiment of the present disclosure, each electrode pad unit 506 includes four adjacent and mutually electrically connected electrode pads 106a. Each electrode pad unit 506 receives a first driving signal. The first driving signal may be a waveform signal. For example, the waveform signal may be a sine wave, a cosine wave, a square wave, a triangular wave, or a sawtooth wave. However, the present disclosure is not limited thereto. In summary, the touch unit array 500 is a touch unit array integrated both mutual capacitance devices and self capacitance devices. Accordingly, the touch unit array 500 is capable to utilize both touch sensing devices with different sensing methods. By the coping with both mutual capacitance devices and self capacitance devices, the touch sensing signals generated by the touching object can be detected regardless the touching object is relatively close to or relatively distant from the touch unit array 500. Comparing to the touch unit array 400 illustrated in FIG. 4, the density of the electrode pad unit 506 of the touch unit array 500 illustrated in FIG. 5 is one-fourth of the density of the electrode pad unit 106 of the touch unit array 400, therefore the precision of sensing locations of the touch unit array 500 may be not as precise as the touch unit array 400. However, since the electrode pad unit 506 includes four electrode pads 106a, the intensity of the touch sensing of the electrode pad unit 506 is stronger than that of the electrode pad unit 106. The intensity of the touch sensing of the electrode pad unit increases when the electrode pad unit includes more electrode pads 106a. Therefore, the touch unit array 500 has stronger touch sensing sensitivity of the self capacitance devices. Although the quantity of the electrode pad unit 506 is fewer, the intensity of the touch sensing of the electrode pad unit 506 is stronger than that of aforementioned embodiments. Accordingly, the issue of short detecting distance of the mutual capacitance devices can be compensated, and the sensing signals can be effectively detected when the touching object is relatively farer away from the touch unit array 500.

Figure 8:
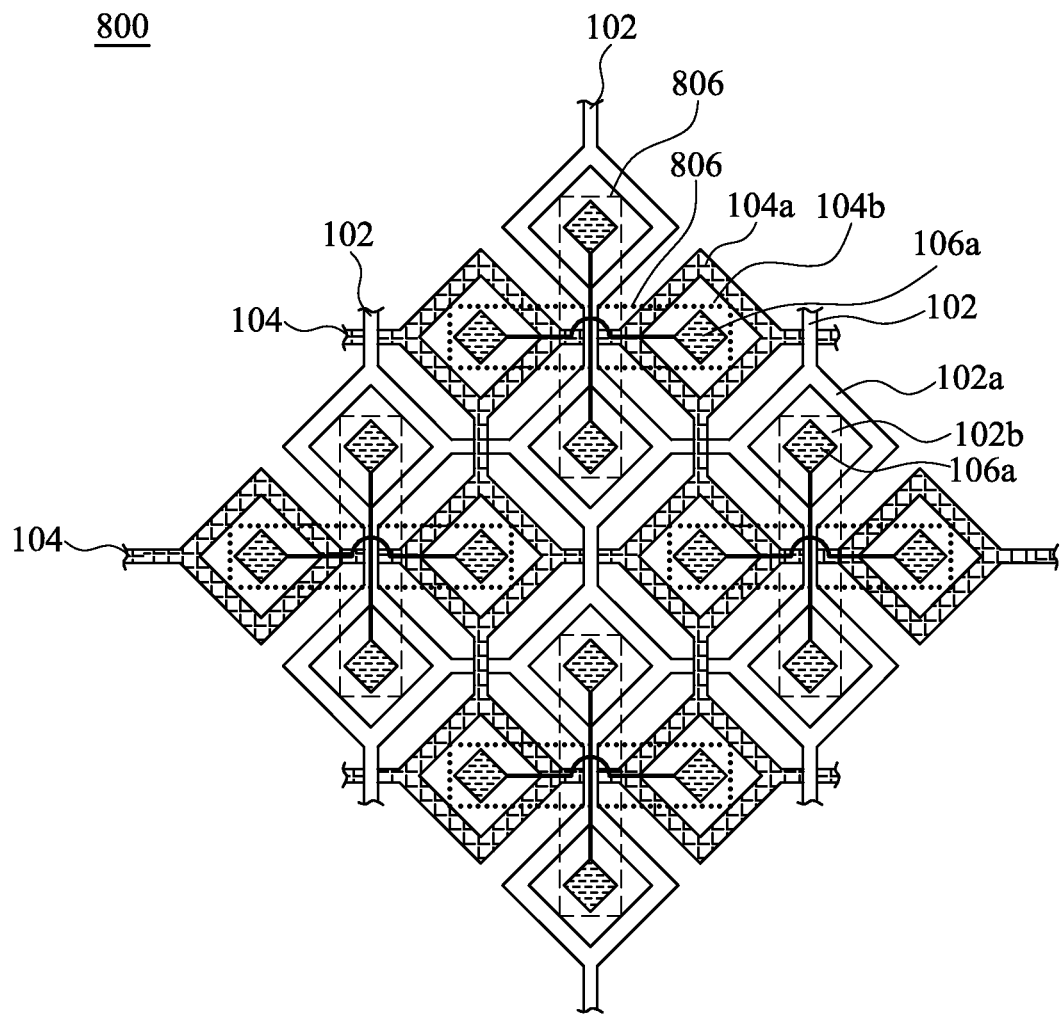
FIG. 8 is a schematic view of a portion of a touch unit array according to the sixth embodiment of the present disclosure.

Referring to FIG. 8, FIG. 8 is a schematic view of a portion of a touch unit array 800 according to the sixth embodiment of the present disclosure. The touch unit array 800 also includes the plurality of first strip electrodes 102, the plurality of second strip electrodes 104, and the plurality of electrode pad units 806. The first strip electrodes 102 and the second strip electrodes 104 are interlaced and electrically isolated with each other. The extending direction of the first strip electrodes 102 may be orthogonal to that of the second strip electrodes 104. However, the present disclosure is not limited thereto. As illustrated in FIG. 8, each first strip electrode 102 includes a plurality of electrically connected first electrode pads 102a, and each second strip electrode 104 includes a plurality of electrically connected second electrode pads 104a. The positions of above elements and the connections between them are similar to those of the aforementioned embodiments of the present disclosure, and therefore the details are omitted here. It should be noticed that, which is different from those of aforementioned embodiments, each electrode pad unit 806 includes two electrode pads 106a which are mutually electrically connected and respectively disposed in two adjacent first openings 102a and/or two adjacent second openings 104b. In other words, each of the plurality of the electrode pad units 806 of the touch unit array 800 according to the sixth embodiment of the present disclosure includes two electrode pads 106a. Therefore, the pattern of the electrode pad units 806 of the sixth embodiment of the present disclosure is different from that of the electrode pad units 106, 506 of the aforementioned embodiments of the present disclosure. As illustrated in FIG. 8, each the first electrode pad 102a has the first opening 102b; and each the second electrode pad 104a has the second opening 104b. The electrode pads 106a are respectively disposed in all of the first openings 102b and the second openings 104b. The electrode pads 106a are electrically isolated to the first electrode pads 102a and the second electrode pad 104a. And two electrode pads 106a, which are respectively disposed in two adjacent first openings 102b and/or two adjacent second openings 104b, are mutually electrically connected and construct the electrode pad units 806. Accordingly, the touch unit array 800 including the plurality of first strip electrodes 102, the plurality of second strip electrodes 104, and the plurality of electrode pad units 806 is constructed as analogized by the portion illustrated in FIG. 8.

In the touch unit array 800, the first electrode pad 102a of the first strip electrode 102 and the second electrode pad 104a of the second strip electrode 104 are the mutual capacitance device of the sixth embodiment. That is, the first electrode pad 102a and the second electrode pad 104a adjacent to the first electrode pad 102a are one pair of mutual capacitance electrodes. On the other hand, the electrode pad unit 806 is the self capacitance device of the sixth embodiment. Each first strip electrode 102 receives a second driving signal therefore each first electrode pad 102a of each first strip electrode 102 possesses a voltage. Each electrode pad unit 806 receives a first driving signal. The driving method and the principle of operation of the second embodiment are similar to those of the first embodiment, and therefore the details are omitted here. Comparing to the touch unit array 400 illustrated in FIG. 4, the density of the electrode pad unit 806 of the touch unit array 800 illustrated in FIG. 8 is one-second of the density of the electrode pad unit 106 of the touch unit array 400, therefore the precision of sensing locations of the touch unit array 800 may be not as precise as the touch unit array 400. However, since the electrode pad unit 806 includes two electrode pads 106*a*, the intensity of the touch sensing of the electrode pad unit 806 is still stronger than that of the electrode pad unit 106. The intensity of the touch sensing of the electrode pad unit increases when the electrode pad unit includes more electrode pads 106*a*. Therefore, the touch unit array 800 has stronger touch sensing sensitivity of the self capacitance devices. Although the quantity of the electrode pad unit 806 is fewer than that of the electrode pad unit 106, the intensity of the touch sensing of each electrode pad unit 806 is stronger than that of each electrode pad unit 106. Accordingly, the issue of short detecting distance of the mutual capacitance devices can be compensated, and the sensing signals can be effectively detected when the touching object is relatively distant from the touch unit array 800.

Referring to FIG. 1A to FIG. 8, it should be noticed that not only the density of the self capacitance devices (electrode pads 106*a*), which are integrated to the mutual capacitance devices (the first electrode pads 102*a* of the first strip electrodes 102 and the second electrode pads 104*a* of the second strip electrode pads 104), can be adjusted and optimized according to various demands (as shown in FIGS. 1A-4), but also the design of the electrode pad unit can be optimized according to required precisions of the touch sensing position and effective distances between the touching object and the touch unit array (as the electrode pad units 106 shown in FIGS. 1A-4, the electrode pad units 506 shown in FIG. 5, and the electrode pad units 806 shown in FIG. 8). In the touch unit arrays 100, 200, 300, 400, 500, and 800 of the present disclosure, the self capacitance devices (the electrode pad units 106, 506, 806) are integrated into the XY plane of mutual capacitance devices in the concept of divided regions. That is, in the network of mutual capacitance devices, which are constructed by the plurality of first electrode pad 102*a* of each first strip electrodes 102 first and the second electrode pad 104*a* of each second strip electrode 104, the self capacitance devices (electrode pad units 106, 506 or 806) contribute to detecting relatively far touching signals. Therefore, the issue that the mutual capacitance devices is not capable to effectively detect relatively far touching signals can be compensated by the self capacitance devices.

Figure 9:
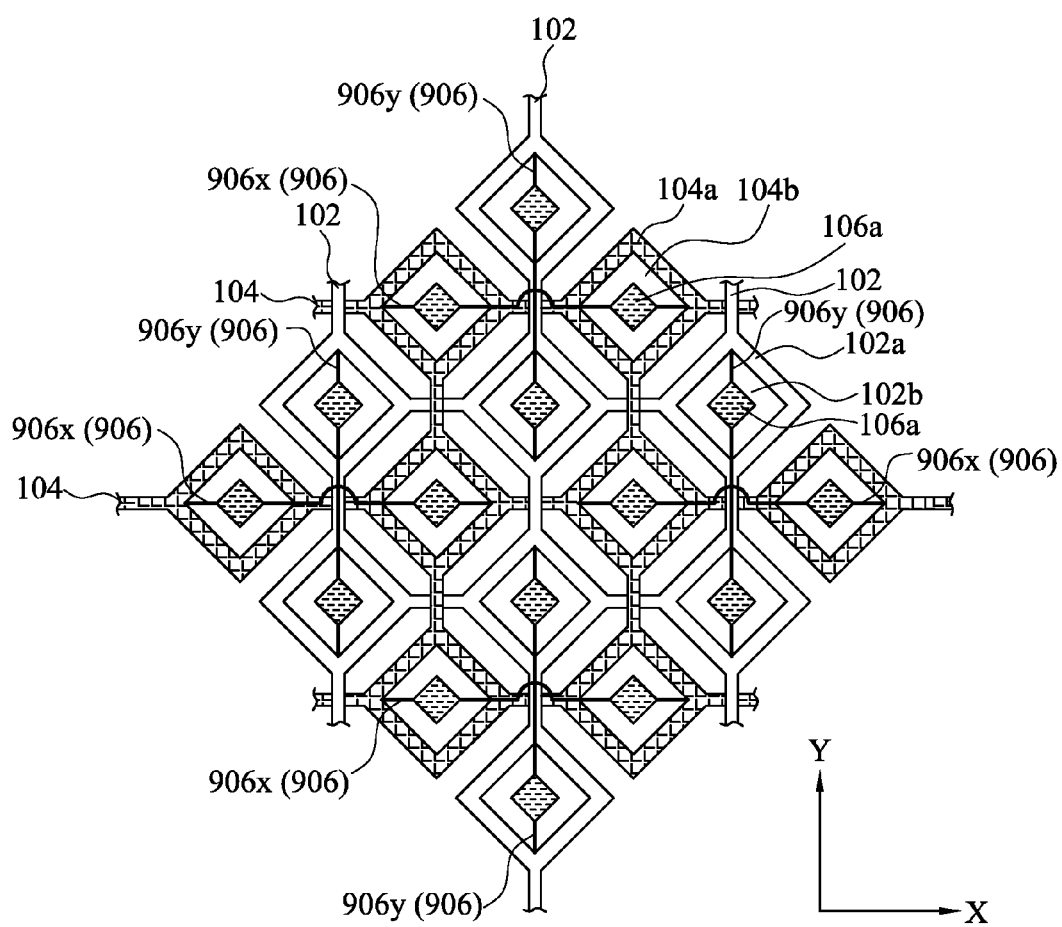
FIG. 9 is a schematic view of a portion of a touch unit array according to the seventh embodiment of the present disclosure.
Figure 10A:
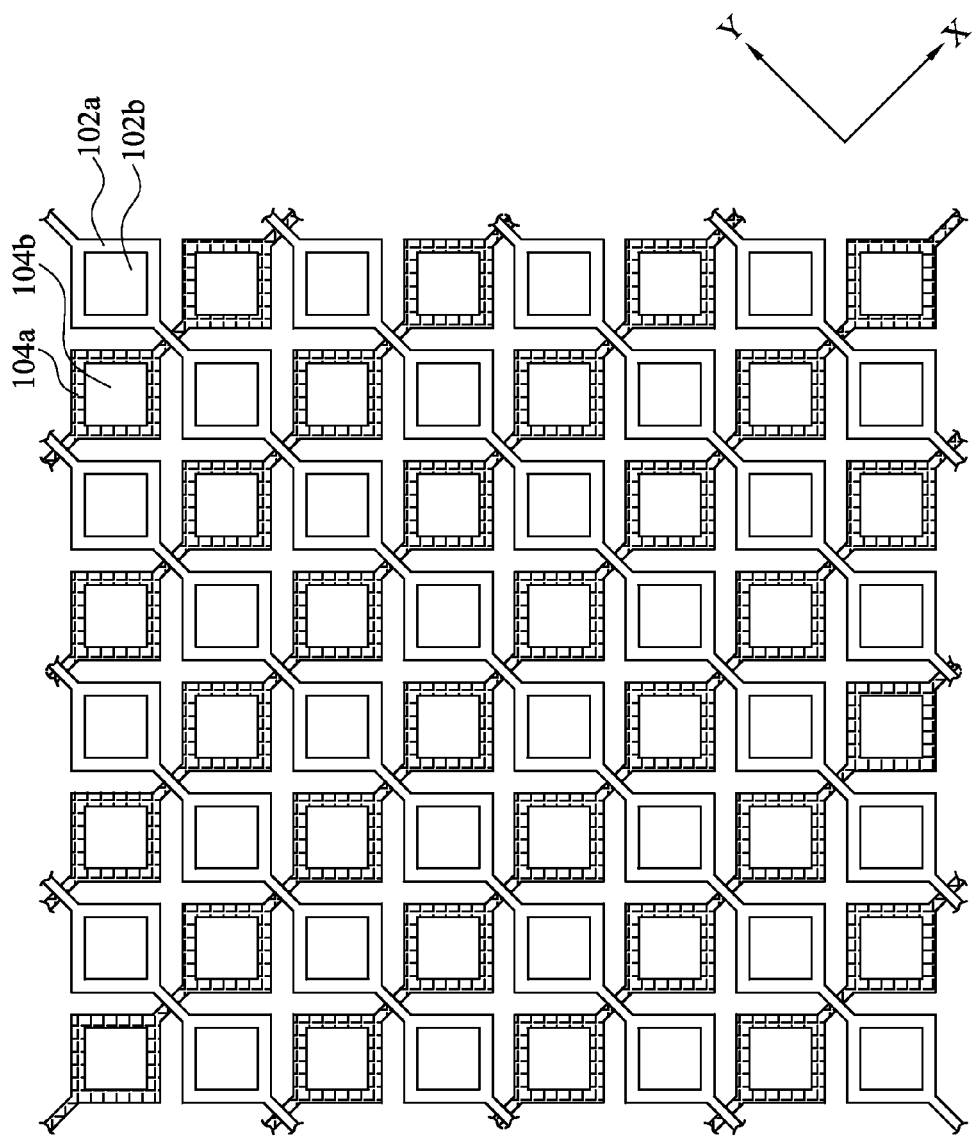
FIG. 10A is a schematic view of the mutual capacitance devices of the touch unit array according to the seventh embodiment of the present disclosure.
Figure 10B:
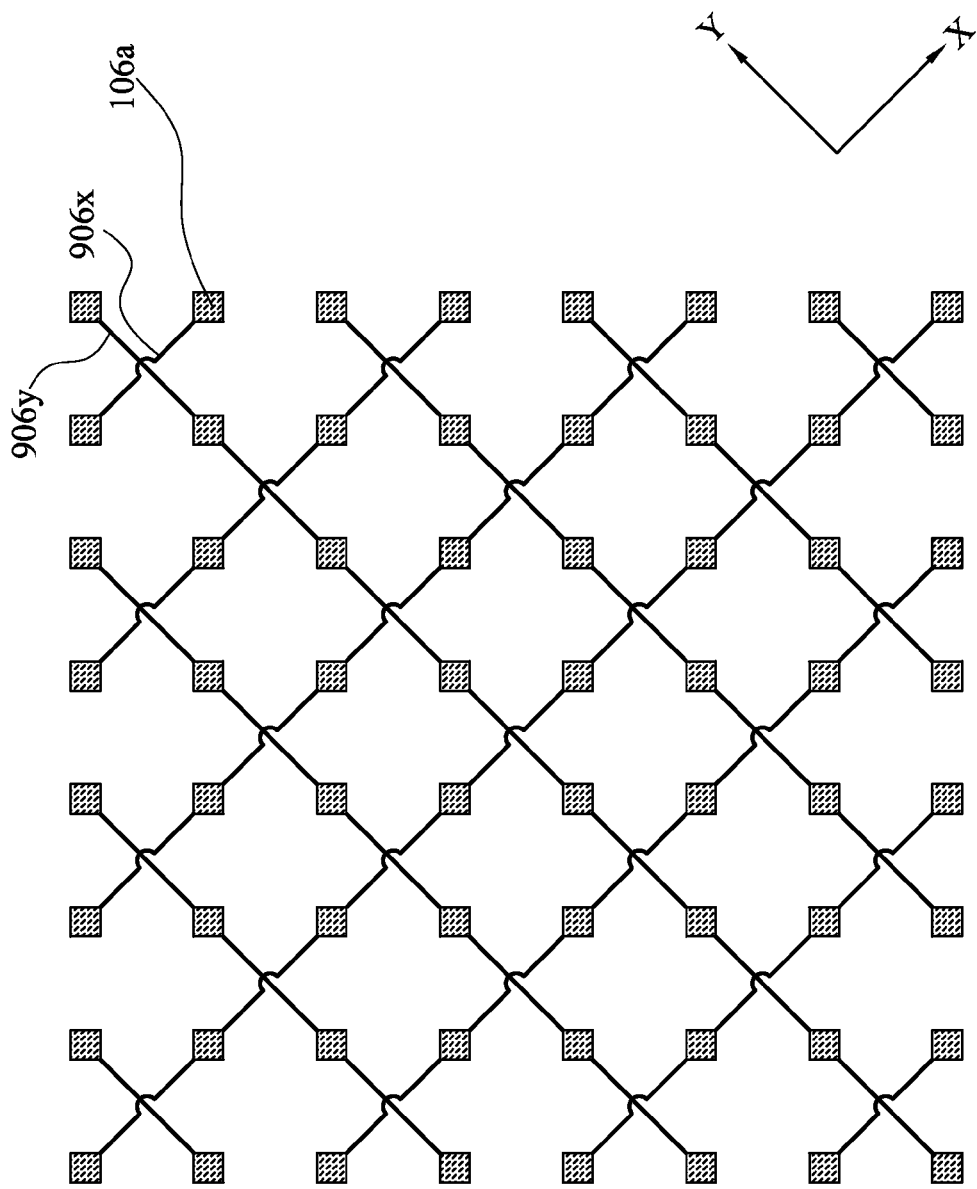
FIG. 10B is a schematic view of the self capacitance devices of the touch unit array according to the seventh embodiment of the present disclosure.

Referring to FIG. 9, FIG. 9 is a schematic view of a portion of a touch unit array 900 according to the seventh embodiment of the present disclosure. The touch unit array 900 also includes the plurality of first strip electrodes 102, the plurality of second strip electrodes 104, and the plurality of electrode pad units 906. The first strip electrodes 102 and the second strip electrodes 104 are interlaced and electrically isolated with each other. The extending direction of the first strip electrodes 102 may be orthogonal to that of the second strip electrodes 104. However, the present disclosure is not limited thereto. As illustrated in FIG. 9, each first strip electrode 102 includes a plurality of electrically connected first electrode pads 102*a*, and each second strip electrode 104 includes a plurality of electrically connected second electrode pads 104*a*. The positions of above elements and the connections between them are similar to those of the aforementioned embodiments of the present disclosure, and therefore the details are omitted here. It should be noticed that, which is different from those of aforementioned embodiments, electrode pad units 906 are arranged as the XY plane constructed by the first strip electrode 102 and the second strip electrode 104, and the plurality of electrode pad units 906 is divided into the plurality of horizontal strips of electrode pads 906*x* and the plurality of vertical strips of electrode pads 906*y*. As illustrated in FIG. 9, the plurality of horizontal strips of electrode pads 906*x* is arranged orthogonally to the plurality of vertical strips of electrode pads 906*y*. Each of the plurality of horizontal strips of electrode pads 906*x*(906) includes the electrode pads 106*a* which are mutually electrically connected and respectively disposed in the second openings 104*b* of one second strip electrode 104; and each of the plurality of vertical strips of electrode pads 906*y*(906) includes the electrode pads 106*a* which are mutually electrically connected and respectively disposed in the first openings 102*b* of one first strip electrode 102. In other words, the electrode pad units 906 of the touch unit array 900 according to the seventh embodiment of the present disclosure are not integrated into the XY plane, which is constructed by first strip electrodes 102 and the second strip electrode 104, by the concept of divided regions. The electrode pad units 906 of the touch unit array 900 are integrated into the XY plane with another XY plane. As illustrated in FIG. 9, each the first electrode pad 102*a* has the first opening 102*b*; and each the second electrode pad 104*a* has the second opening 104*b*. The electrode pads 106*a* are respectively disposed in all of the first openings 102*b* and the second openings 104*b*. The electrode pads 106*a* are electrically isolated to the first electrode pads 102*a* and the second electrode pad 104*a*. The electrode pads 106*a*, which are mutually electrically connected and respectively disposed in the first openings 102*b* of one first strip electrode 102, constructed one electrode pad unit 906. In other words, one vertical strip of electrode pads 906*y* is one electrode pad unit 906. Similarly, the electrode pads 106*a*, which are mutually electrically connected and respectively disposed in the second openings 104*b* of one second strip electrode 104, constructed one electrode pad unit 906. In other words, one horizontal strip of electrode pads 906*x* is also another one electrode pad unit 906. Accordingly, the touch unit array 900 including the plurality of first strip electrodes 102, the plurality of second strip electrodes 104, and the plurality of electrode pad units 906 is constructed as analogized by the portion illustrated in FIG. 9. To be more specific, structures in FIG. 10A and FIG. 10B construct touch unit array 900 in FIG. 9. FIG. 10A is a schematic view of the mutual capacitance devices of the touch unit array 900 according to the seventh embodiment of the present disclosure; FIG. 10B is a schematic view of the self capacitance devices of the touch unit array 900 according to the seventh embodiment of the present disclosure.

In the touch unit array 900, the first electrode pad 102*a* of the first strip electrode 102 and the second electrode pad 104*a* of the second strip electrode 104 are the mutual capacitance device of the seventh embodiment. That is, the first electrode pad 102*a* and the second electrode pad 104*a* adjacent to the first electrode pad 102*a* are one pair of mutual capacitance electrodes. Each first strip electrode 102 receives a second driving signal; therefore each first electrode pad 102*a* of each first strip electrode 102 possesses a voltage. Each electrode pad unit 906 receives a first driving signal. The driving method and the principle of operation of the seventh embodiment are similar to those of the first embodiment, and therefore the details are omitted here. It should be noticed that, the electrode pad units 906 of the touch unit array 900 are the plurality of horizontal strips of electrode pads 906*x* and the plurality of vertical strips of electrode pads 906*y*. Therefore, the electrode pad unit 906 of the touch unit array 900 is different from the electrode pad unit 106, 506 and 606 of aforementioned embodiments. The structure of electrode pad units 906 of the touch unit array 900 are similar to that of the mutual capacitance devices (the XY plane which is constructed by the first strip electrodes 102 and the second strip electrodes 104 crossed to the first strip electrodes 102), and different from those of the electrode pad unit 106, 506 and 606 of aforementioned embodiments (the divided regions, which is constructed by individually electrode pad unit 106, 506 and 606 of aforementioned embodiments). Accordingly, the touch unit array 900 is also capable to utilize both touch sensing devices with different sensing methods. By the coping with both mutual capacitance devices and self capacitance devices, the touch sensing signals generated by the touching object can be detected regardless the touching object is relatively close to or relatively distant from the touch unit array 900.

Referring to FIGS. 9, 10A, and 10B, FIG. 10A illustrates one portion of the plurality of the first strip electrodes 102 and the plurality of the second strip electrodes 104 crossed to the plurality of the first strip electrodes 102 in FIG. 9; FIG. 10B illustrates the other portion of the plurality of the horizontal strip of electrode pads 906x and the plurality of the vertical strip of electrode pads 906y crossed to the plurality of the horizontal strip of electrode pads 906x in FIG. 9. The plurality of the horizontal strip of electrode pads 906x and the plurality of the vertical strip of electrode pads 906y may also be regarded as the mutual capacitance devices in the touch unit array 900, and the plurality of the first strip electrodes 102 and the plurality of the second strip electrodes 104 may be regarded as the self capacitance devices in the touch unit array 900 accordingly. In this case, each horizontal strip of electrode pad 906x receives a second driving signal therefore each electrode pad 106a of horizontal strip of electrode pads 906x possesses a voltage. And corresponding electrode pad 106a of the vertical strip of electrode pad 906y outputs the detecting signals of the capacitance difference between the electrode pad 106a of horizontal strip of electrode pads 906x and the electrode pad 106a of the vertical strip of electrode pad 906y. When an touching object approaches, the capacitance difference between the capacitance variation between the electrode pad 106a of horizontal strip of electrode pads 906x and the electrode pad 106a of the vertical strip of electrode pad 906y is produced and releases electrons stored therein, therefore released electrons can be detected and the position touched by the touching object can be detected. In detail, the horizontal strips of electrode pads 906x illustrated in FIG. 9 and FIG. 10B are, for example, the driving lines extending along X-axis; the vertical strips of electrode pads 906y illustrated in FIG. 9 and FIG. 10B are, for example, the sensing lines extending along Y-axis. Sequential driving is performed by the driving lines (the horizontal strips of electrode pads 906x), and the point sensor signal is detected by whole sensing or sequential sensing performed by the sensing lines (the vertical strips of electrode pads 906y). However, the present disclosure is not limited thereto. The vertical strips of electrode pads 906y could be the sensing lines, and the horizontal strips of electrode pads 906x could be the driving lines accordingly. The mutual capacitance device of touch unit array 900, which is constructed by the horizontal strips of electrode pads 906x and the vertical strips of electrode pads 906y, may not be capable to sense the touch signal when the touching object is relatively distant from the touch unit array 900. The capacitance difference between them may not be obvious enough to be detected when the touching object is relatively distant from the touch unit array 900. In this case, the self capacitance devices, which are constructed by the first strip electrodes 102 and the second strip electrode 104, are capable to sense the capacitance generated between the touching object and itself, and compensate this issue. The first strip electrodes 102 and the second strip electrode 104 respectively receive a first driving signal.

Figure 11:
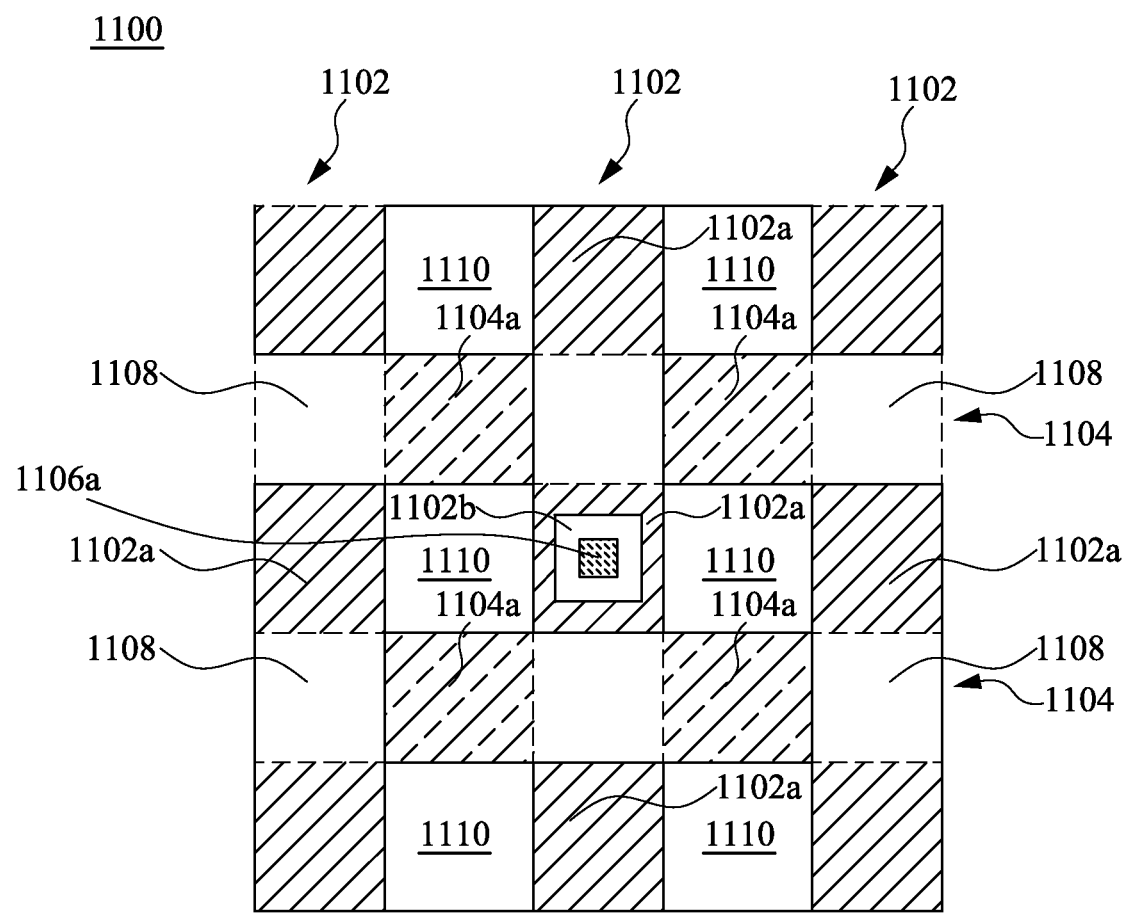
FIG. 11 is a schematic view of a portion of a touch unit array according to the eighth embodiment of the present disclosure.

Referring to FIG. 11, FIG. 11 is a schematic view of a portion of a touch unit array 1100 according to the eighth embodiment of the present disclosure. The touch unit array 1100 includes a plurality of first strip electrodes 1102, a plurality of second strip electrodes 1104, and a plurality of electrode pad units 1106. The first strip electrodes 1102 and the second strip electrodes 1104 are interlaced to form a plurality of overlapping patterns 1108 and a plurality of interspaces 1110. The overlapping patterns 1108 are the portions of each first strip electrode 1102 overlapped with each second strip electrodes 1104. In the overlapping patterns 1108, an isolation layer (not shown) can be disposed between the first strip electrode 1102 and the second strip electrodes 1104 to avoid interference between the voltage of the first strip electrodes 1102 and that of the second strip electrodes 1104. The interspaces 1110 are the spaces without the first strip electrode 1102 and the second strip electrodes. The extending direction of the first strip electrodes 1102 may be orthogonal to that of the second strip electrodes 1104; however, the present disclosure is not limited thereto. As illustrated in FIG. 11, each first strip electrode 1102 includes a plurality of first electrode pads 1102a and a plurality of overlapping patterns 1108 which is alternatively arranged with the plurality of first electrode pads 1102a; and each second strip electrode 1104 includes a plurality of second electrode pads 1104a and a plurality of overlapping patterns 1108 which is alternatively arranged with the plurality of second electrode pads 1104a. It should be noticed that the first electrode pad 1102a in the middle of FIG. 11 has a first opening 102b, and the first electrode pad 102a having the first opening 102b is surrounded by the interspaces 1110, the overlapping patterns 1108, and the second electrode pads 1104a without openings as described in aforementioned embodiments. An electrode pad 1106a is disposed in the first opening 1102b, and the electrode pad 1106a is electrically isolated to the first electrode pad 1102a with the first opening 1102b. Therefore, the electrode pad 1106a receives a first driving signal independently without being affected by the first strip electrode 1102 with the first opening 1102b, which receives a second driving signal. In the eighth embodiment, single electrode pad 1106a is an electrode pad unit 1106. The touch unit array 1100 including the plurality of first strip electrodes 1102, the plurality of second strip electrodes 1104, and the plurality of electrode pad units 1106 is constructed as analogized by the portion illustrated in FIG. 11.

In the touch unit array 1100, the first electrode pad 1102a of the first strip electrode 1102 and the second electrode pad 1104a of the second strip electrode 1104 construct the mutual capacitance device of the eighth embodiment. That is, the first electrode pad 1102a and the second electrode pad 1104a adjacent to the first electrode pad 1102a are one pair of mutual capacitance electrodes. On the other hand, the electrode pad unit 1106 is the self capacitance device of the eighth embodiment. Each first strip electrode 1102 receives a second driving signal respectively; therefore each first electrode pad 1102a of each first strip electrode 1102 possesses a voltage. The driving method and the principle of operation of the eighth embodiment are similar to those of the first embodiment, and therefore the details are omitted here.

Figure 12:
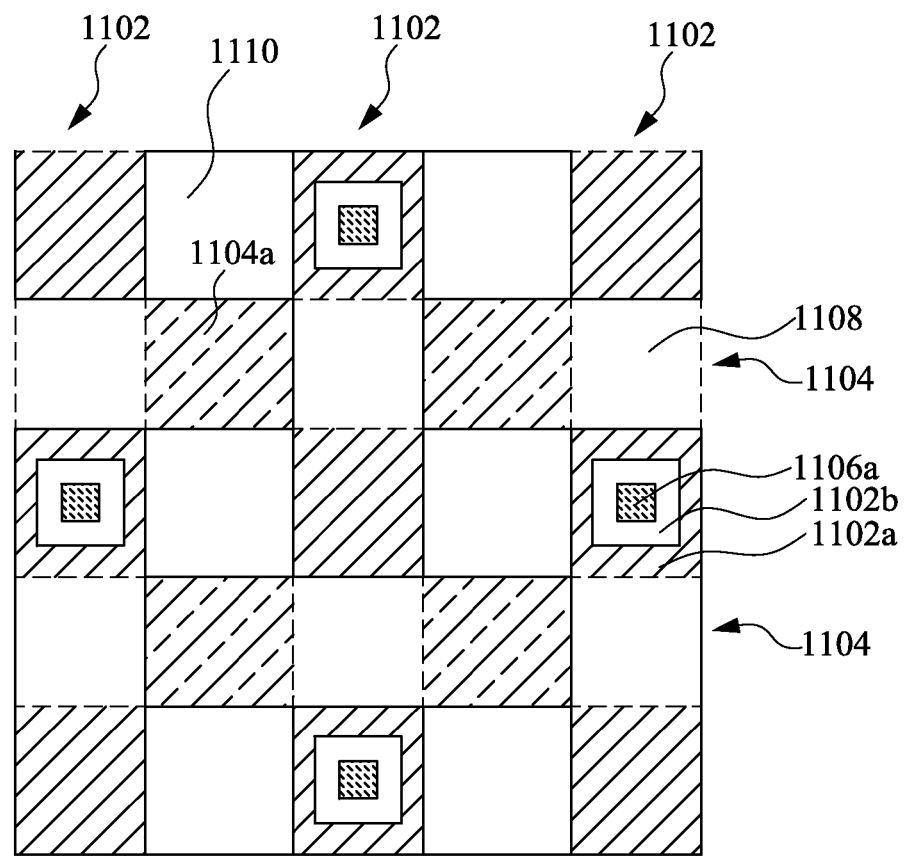
FIG. 12 is a schematic view of a portion of a touch unit array according to the ninth embodiment of the present disclosure.

Referring to FIG. 12, FIG. 12 is a schematic view of a portion of a touch unit array 1200 according to the ninth embodiment of the present disclosure. The touch unit array 1200 also includes the plurality of first strip electrodes 1102, the plurality of second strip electrodes 1104, and the plurality of electrode pad units 1106. The first strip electrodes 1102 and the second strip electrodes 1104 are interlaced to form the plurality of overlapping patterns 1108 and the plurality of interspaces 1110. The overlapping patterns 1108 are the portions of each first strip electrode 1102 overlapped with each second strip electrodes 1104. In the overlapping patterns 1108, an isolation layer (not shown) can be disposed between the first strip electrode 1102 and the second strip electrodes 1104 to avoid interference between the voltage of the first strip electrodes 1102 and that of the second strip electrodes 1104. The interspaces 1110 are the spaces without the first strip electrode 1102 and the second strip electrodes. The extending direction of the first strip electrodes 1102 may be orthogonal to that of the second strip electrodes 1104; however, the present disclosure is not limited thereto. As illustrated in FIG. 12, each first strip electrode 1102 includes the plurality of first electrode pads 1102a and the plurality of overlapping patterns to 1108 which is alternatively arranged with the plurality of first electrode pads 1102a; and each second strip electrode 1104 includes the plurality of second electrode pads 1104a and the plurality of overlapping patterns 1108 which is alternatively arranged with the plurality of second electrode pads 1104a. It should be noticed that, which is different from that illustrated in FIG. 11, the first electrode pad 1102a in the middle of FIG. 11 does not have the first opening 1102b, but the first electrode pads 1102a surrounding the first electrode pad 1102a in the middle of FIG. 11 have the first openings 102b respectively. The second electrode pads 1104a also do not have openings. The electrode pads 1106a are disposed in the first openings 1102b respectively, and the electrode pads 1106a are electrically isolated to the first electrode pads 1102a with the first opening 1102b. Therefore, the electrode pad 1106a receives a first driving signal independently without being affected by the first strip electrode 1102 with the first opening 1102b, while the first strip electrode 1102 receives a second driving signal. In the ninth embodiment, single electrode pad 1106a is also an electrode pad unit 1106. The touch unit array 1200 including the plurality of first strip electrodes 1102, the plurality of second strip electrodes 1104, and the plurality of electrode pad units 1106 is constructed as analogized by the portion illustrated in FIG. 12. In the touch unit array 1200, the first electrode pad 1102a of the first strip electrode 1102 and the second electrode pad 1104a of the second strip electrode 1104 also construct the mutual capacitance device of the ninth embodiment. That is, the first electrode pad 1102a and the second electrode pad 1104a adjacent to the first electrode pad 1102a are one pair of mutual capacitance electrodes. On the other hand, the electrode pad unit 1106 is the self capacitance device of the ninth embodiment. Each first strip electrode 1102 receives a second driving signal therefore each first electrode pad 1102a of each first strip electrode 1102 possesses a voltage. The driving method and the principle of operation of the ninth embodiment are similar to those of the first embodiment, and therefore the details are omitted here.

Figure 13:
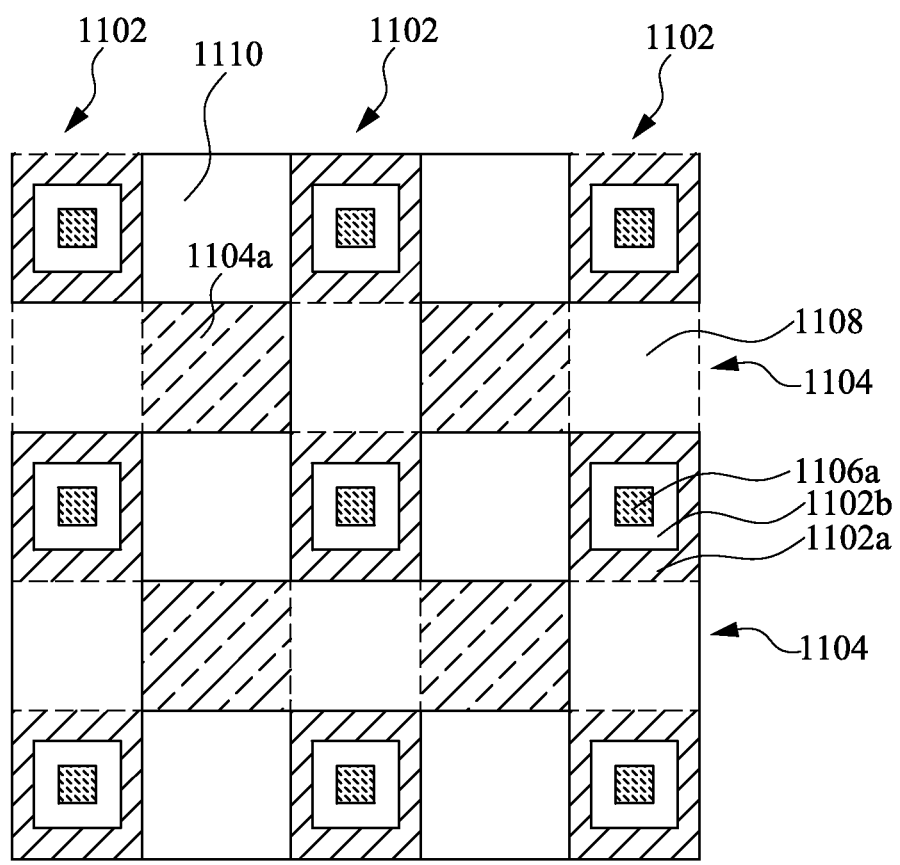
FIG. 13 is a schematic view of a portion of a touch unit array according to the tenth embodiment of the present disclosure.

Referring to FIG. 13, FIG. 13 is a schematic view of a portion of a touch unit array 1300 according to the tenth embodiment of the present disclosure. The touch unit array 1300 also includes the plurality of first strip electrodes 1102, the plurality of second strip electrodes 1104, and the plurality of electrode pad units 1106. The first strip electrodes 1102 and the second strip electrodes 1104 are interlaced to form the plurality of overlapping patterns 1108 and the plurality of interspaces 1110. The extending direction of the first strip electrodes 1102 may be orthogonal to that of the second strip electrodes 1104; however, the present disclosure is not limited thereto. As illustrated in FIG. 13, each first strip electrode 1102 includes the plurality of first electrode pads 1102a and the plurality of overlapping patterns 1108 which is alternatively arranged with the plurality of first electrode pads 1102a; and each second strip electrode 1104 includes the plurality of second electrode pads 1104a and the plurality of overlapping patterns 1108 which is alternatively arranged with the plurality of second electrode pads 1104a. It should be noticed that, which is different from that illustrated in FIG. 11 and FIG. 12, all first electrode pads 1102a have the first opening 1102b. As illustrated in FIG. 13, all second electrode pads 1104a does not have openings. The electrode pads 1106a are disposed in the first openings 1102b respectively, and the electrode pads 1106a are electrically isolated to the first electrode pads 1102a with the first opening 1102b. Therefore, the electrode pad 1106a receives a first driving signal independently without being affected by the first strip electrode 1102 with the first opening 1102b, while the first strip electrode 1102 receives a second driving signal. In the tenth embodiment, single electrode pad 1106a is also an electrode pad unit 1106. The touch unit array 1300 including the plurality of first strip electrodes 1102, the plurality of second strip electrodes 1104, and the plurality of electrode pad units 1106 is constructed as analogized by the portion illustrated in FIG. 13.

In the touch unit array 1300, the first electrode pad 1102a of the first strip electrode 1102 and the second electrode pad 1104a of the second strip electrode 1104 also construct the mutual capacitance device of the tenth embodiment. That is, the first electrode pad 1102a and the second electrode pad 1104a adjacent to the first electrode pad 1102a are one pair of mutual capacitance electrodes. On the other hand, the electrode pad unit 1106 is the self capacitance device of the tenth embodiment. Each first strip electrode 1102 receives a second driving signal; therefore each first electrode pad 1102a of each first strip electrode 1102 possesses a voltage. The driving method and the principle of operation of the tenth embodiment are similar to those of the first embodiment, and therefore the details are omitted here.

Figure 14:
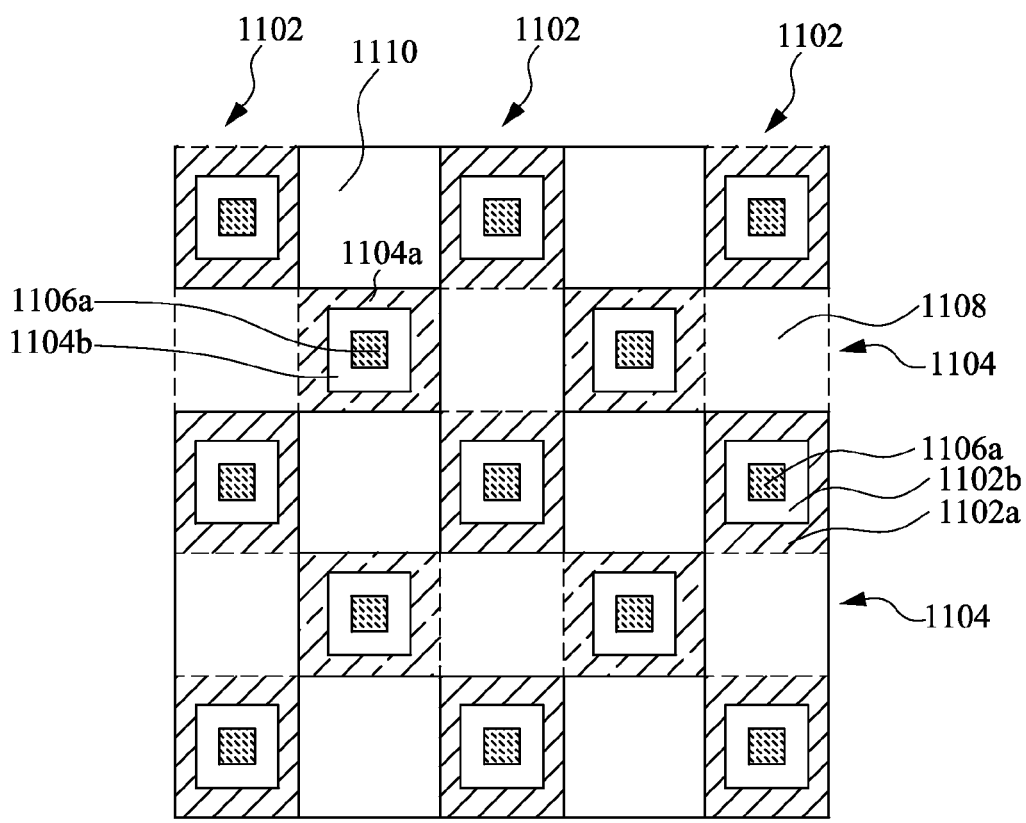
FIG. 14 is a schematic view of a portion of a touch unit array according to the eleventh embodiment of the present disclosure.

Referring to FIG. 14, FIG. 14 is a schematic view of a portion of a touch unit array 1400 according to the eleventh embodiment of the present disclosure. The touch unit array 1400 also includes the plurality of first strip electrodes 1102, the plurality of second strip electrodes 1104, and the plurality of electrode pad units 1106. The first strip electrodes 1102 and the second strip electrodes 1104 are interlaced to form the plurality of overlapping patterns 1108 and the plurality of interspaces 1110. The extending direction of the first strip electrodes 1102 may be orthogonal to that of the second strip electrodes 1104; however, the present disclosure is not limited thereto. As illustrated in FIG. 14, each first strip electrode 1102 includes the plurality of first electrode pads 1102a and the plurality of overlapping patterns 1108 which is alternatively arranged with the plurality of first electrode pads 1102a; and each second strip electrode 1104 includes the plurality of second electrode pads 1104a and the plurality of overlapping patterns 1108 which is alternatively arranged with the plurality of second electrode pads 1104a. It should be noticed that, which is different from that illustrated in FIG. 10, all first electrode pads 1102a have the first opening 102b and all second electrode pads 1104a have the second opening 1104b. As illustrated in FIG. 14, the electrode pads 1106a are disposed in the first openings 1102b and the second openings 1104b respectively, and the electrode pads 1106a are electrically isolated to the first electrode pads 1102a and the second electrode pads 1104a. Therefore, the electrode pad 1106a receives a first driving signal independently without being affected by the first strip electrode 1102, which receives a second driving signal, and the second strip electrode 1104, which outputs the detecting signals. In the eleventh embodiment, single electrode pad 1106*a* is also an electrode pad unit 1106. The touch unit array 1400 including the plurality of first strip electrodes 1102, the plurality of second strip electrodes 1104, and the plurality of electrode pad units 1106 is constructed as analogized by the portion illustrated in FIG. 14.

In the touch unit array 1400, the first electrode pad 1102*a* of the first strip electrode 1102 and the second electrode pad 1104*a* of the second strip electrode 1104 also construct the mutual capacitance device of the eleventh embodiment. That is, the first electrode pad 1102*a* and the second electrode pad 1104*a* adjacent to the first electrode pad 1102*a* are one pair of mutual capacitance electrodes. On the other hand, the electrode pad unit 1106 is the self capacitance device of the eleventh embodiment. Each first strip electrode 1102 receives a second driving signal; therefore each first electrode pad 1102*a* of each first strip electrode 1102 possesses a voltage. The driving method and the principle of operation of the eleventh embodiment are similar to those of the first embodiment, and therefore the details are omitted here.

Figure 15:
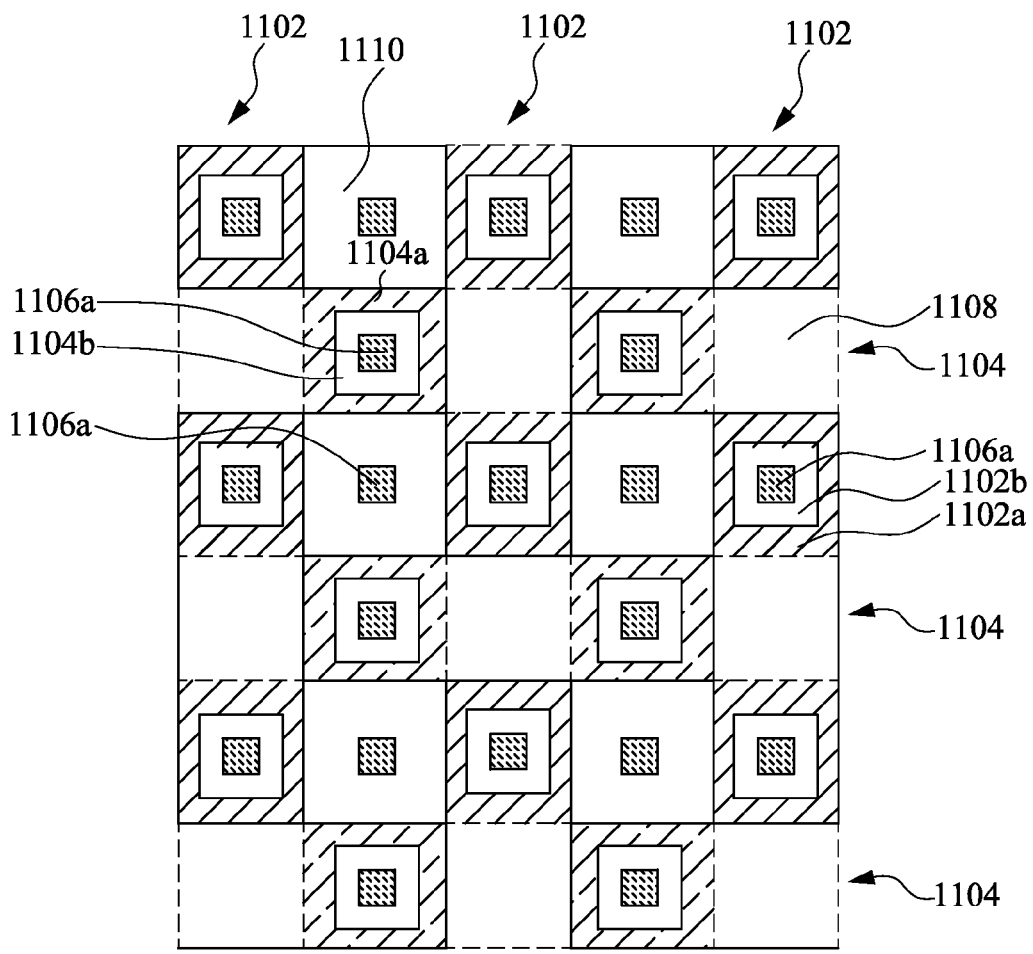
FIG. 15 is a schematic view of a portion of a touch unit array according to the twelfth embodiment of the present disclosure.

Referring to FIG. 15, FIG. 15 is a schematic view of a portion of a touch unit array 1500 according to the twelfth embodiment of the present disclosure. The touch unit array 1500 also includes the plurality of first strip electrodes 1102, the plurality of second strip electrodes 1104, and the plurality of electrode pad units 1106. The first strip electrodes 1102 and the second strip electrodes 1104 are interlaced to form the plurality of overlapping patterns 1108 and the plurality of interspaces 1110. The extending direction of the first strip electrodes 1102 may be orthogonal to that of the second strip electrodes 1104; however, the present disclosure is not limited thereto. As illustrated in FIG. 15, each first strip electrode 1102 includes the plurality of first electrode pads 1102*a* and the plurality of overlapping patterns 1108 which is alternatively arranged with the plurality of first electrode pads 1102*a*; and each second strip electrode 1104 includes the plurality of second electrode pads 1104*a* and the plurality of overlapping patterns 1108 which is alternatively arranged with the plurality of second electrode pads 1104*a*. It should be noticed that, which is different from that illustrated in FIG. 14, the electrode pads 1106*a* are not only disposed in the first openings 1102*b* and the second openings 1104*b* respectively, but also disposed in the interspaces 1110 respectively. In other words, the electrode pads 1106*a* are disposed in the first openings 1102*b*, the second openings 1104*b*, and the interspaces 1110 respectively. The electrode pads 1106*a* are electrically isolated to the first electrode pads 1102*a* and the second electrode pads 1104*a*. Therefore, the electrode pad 1106*a* receives a first driving signal independently without being affected by the first strip electrode 1102, which receives a second driving signal, and the second strip electrode 1104, which outputs the detecting signals. In the twelfth embodiment, single electrode pad 1106*a* is also an electrode pad unit 1106. The touch unit array 1500 including the plurality of first strip electrodes 1102, the plurality of second strip electrodes 1104, and the plurality of electrode pad units 1106 is constructed as analogized by the portion illustrated in FIG. 15.

In the touch unit array 1500, the first electrode pad 1102*a* of the first strip electrode 1102 and the second electrode pad 1104*a* of the second strip electrode 1104 also construct the mutual capacitance device of the twelfth embodiment. That is, the first electrode pad 1102*a* and the second electrode pad 1104*a* adjacent to the first electrode pad 1102*a* are one pair of mutual capacitance electrodes. On the other hand, the electrode pad unit 1106 is the self capacitance device of the twelfth embodiment. Each first strip electrode 1102 receives a second driving signal; therefore each first electrode pad 1102*a* of each first strip electrode 1102 possesses a voltage. The driving method and the principle of operation of the twelfth embodiment are similar to those of the first embodiment, and therefore the details are omitted here.

Figure 16:
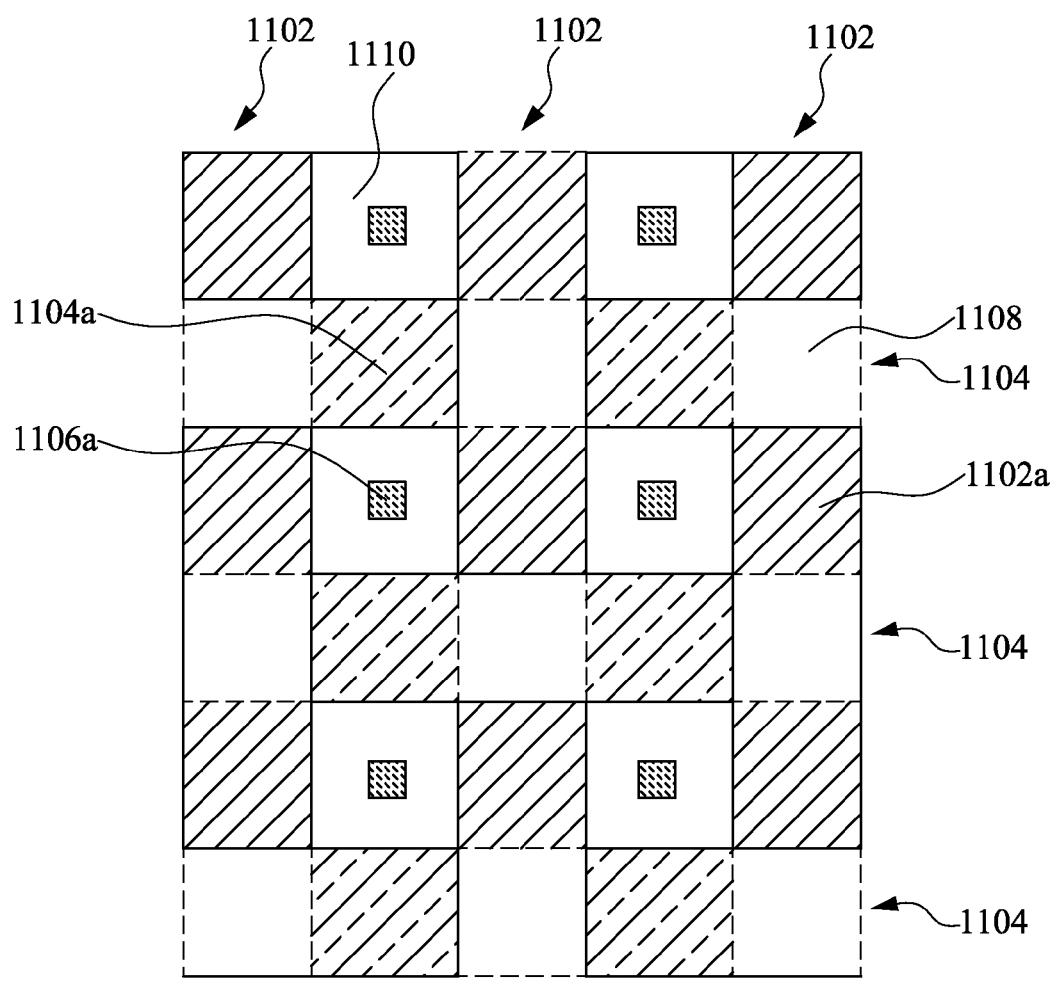
FIG. 16 is a schematic view of a portion of a touch unit array according to the thirteenth embodiment of the present disclosure.

Referring to FIG. 16, FIG. 16 is a schematic view of a portion of a touch unit array 1500 according to the thirteenth embodiment of the present disclosure. The touch unit array 1600 also includes the plurality of first strip electrodes 1102, the plurality of second strip electrodes 1104, and the plurality of electrode pad units 1106. The first strip electrodes 1102 and the second strip electrodes 1104 are interlaced to form the plurality of overlapping patterns 1108 and the plurality of interspaces 1110. The extending direction of the first strip electrodes 1102 may be orthogonal to that of the second strip electrodes 1104; however, the present disclosure is not limited thereto. As illustrated in FIG. 16, each first strip electrode 1102 includes the plurality of first electrode pads 1102*a* and the plurality of overlapping patterns 1108 which is alternatively arranged with the plurality of first electrode pads 1102*a*; and each second strip electrode 1104 includes the plurality of second electrode pads 1104*a* and the plurality of overlapping patterns 1108 which is alternatively arranged with the plurality of second electrode pads 1104*a*. It should be noticed that, which is different from that illustrated in FIG. 15, the electrode pads 1106*a* are only disposed in the interspaces 1110 respectively, and each first electrode pad 1102*a* and each second electrode pad 1104*a* do not have openings for the electrode pads 1106*a*. The electrode pads 1106*a* are electrically isolated to the first electrode pads 1102*a* and the second electrode pads 1104*a*. Therefore, the electrode pad 1106*a* receives a first driving signal independently without being affected by the first strip electrode 1102, which receives a second driving signal, and the second strip electrode 1104, which outputs the detecting signals. In the thirteenth embodiment, single electrode pad 1106*a* is also an electrode pad unit 1106. The touch unit array 1600 including the plurality of first strip electrodes 1102, the plurality of second strip electrodes 1104, and the plurality of electrode pad units 1106 is constructed as analogized by the portion illustrated in FIG. 16.

In the touch unit array 1600, the first electrode pad 1102*a* of the first strip electrode 1102 and the second electrode pad 1104*a* of the second strip electrode 1104 also construct the mutual capacitance device of the thirteenth embodiment. That is, the first electrode pad 1102*a* and the second electrode pad 1104*a* adjacent to the first electrode pad 1102*a* are one pair of mutual capacitance electrodes. On the other hand, the electrode pad unit 1106 is the self capacitance device of the twelfth embodiment. Each first strip electrode 1102 receives a second driving signal; therefore each first electrode pad 1102*a* of each first strip electrode 1102 possesses a voltage. The driving method and the principle of operation of the eighth embodiment is similar to those of the first embodiment, and therefore the details are omitted here.

According to the eighth embodiment to the thirteenth embodiment, the electrode pad unit 1106 only includes single electrode pad 1106*a*. However, the present disclosure is not limited thereto. The electrode pad unit 1106 of the aforementioned embodiments may also be designed to include four, or two electrode pads 1106*a* as illustrated in the fifth embodiment or the sixth embodiments; the electrode pad unit 1106 of the aforementioned embodiments may also be designed into the network structure distributed on XY plane as illustrated in the seventh embodiment.

The features of the various embodiments of one, all or simple modifications interoperable with each other or in combination, which are derived from the design are also in the scope of the present disclosure.

Figure 17:
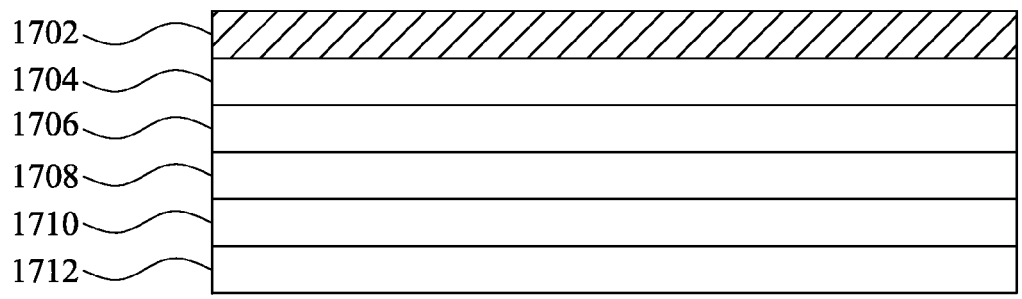
FIGS. 17-19 are schematic views according to the touch display panel of various embodiments of the present disclosure.

Referring to FIG. 17, FIG. 17 is a schematic view according to the touch display panel 1700 of one embodiment of the present disclosure. The touch display panel 1700 includes a first substrate 1712, a pixel array 1710, a display medium 1708, a color filter array 1706, a second substrate 1704, and any one of aforementioned touch unit arrays 1702 of the present disclosure. The first substrate 1712 and the second substrate 1704 may be made of glass, plastic, silicon material, metal or other suitable material as a substrate material. The pixel array 1710 is disposed on the first substrate 1712. The display medium 1708 may be, for example, a liquid crystal material or electrical excitation light materials. If the display medium 1708 is the liquid crystal material, the touch display panel is a liquid crystal touch display panel. For example, a transmission type display panel, a semi-transmission type display panel, a reflective type display panel, (COA) display panel, (AOC) display panel, a vertical alignment type (VA) panel, the level-switching (IPS) display panel, a multi-domain vertical alignment (MVA) display panel, a twisted nematic (TN) display panel, a super twisted nematic (STN) display panel, a pattern is vertical with the type (PVA) display panel, a super-patterned vertical alignment (S-PVA) display panel and advanced large angle type (ASV) display panel, a fringe field switching type (FFS) display panel, a continuous fireworks arranged type (CPA) display panel axisymmetric micellar arrangement type (ASM) display panel array type optically compensated bend (OCB) display panel, super level switch type (S-IPS) display panels, advanced super-level switching type (AS-IPS) display panel, the extreme fringe field switching type (UFFS) display panel, polymer stabilized alignment type display panel, double-angle type (dual-view) display panel, three angle type (triple-view) display panel, three-dimensional display panel (three dimensional) or other type panel, or a combination of the above. If the display medium 1708 is an electrical excitation light material, the display panel is called electroluminescent display panel, which is for example a fluorescent electroluminescent display panel, optical excitation phosphor display panel, or a combination of these, and the electroluminescent display panel is electrically material containing organic material excitation light, inorganic material, or a combination of the above, and electro-luminescent material of molecules, including small molecules, polymers, or a combination of the above, however, the present disclosure is not limited thereto. The display medium 1708 is disposed on the pixel array 1710. The color filter array 1706 is disposed on the display medium 1708. The second substrate 1704 is disposed on the color filter array 1706. The touch unit array 1702 of any one of aforementioned embodiments is disposed on the second substrate 1704 as an out-cell touch panel.

Figure 18:
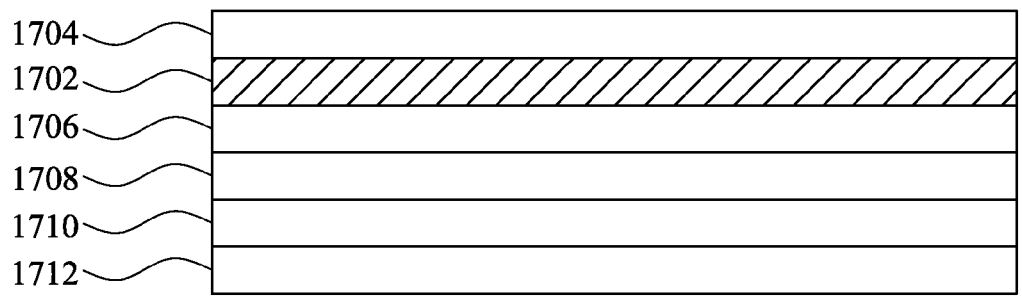
Figure 19:
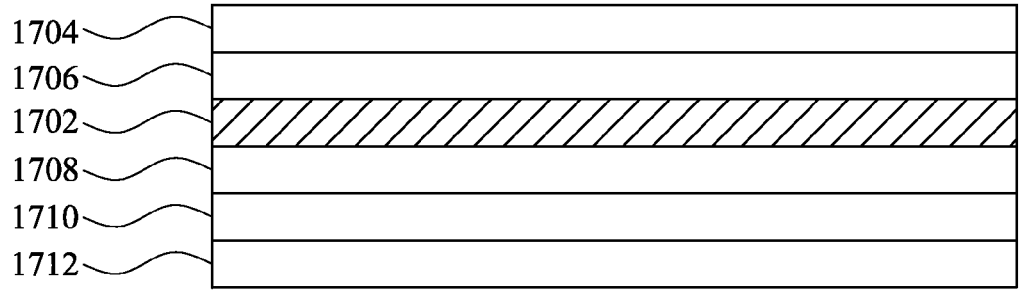

In addition, the touch unit array 1702 of any one of aforementioned embodiments could also be an in-cell touch panel. As illustrated in FIG. 18, the touch unit array 1702 of any one of aforementioned embodiments is disposed between the color filter array 1706 and the second substrate 1704. Or as illustrated in FIG. 19, the touch unit array 1702 of any one of aforementioned embodiments is disposed between the display medium 1708 and the color filter array 1706.

In summary, the touch unit arrays provided in the present disclosure are the touch unit arrays integrated both mutual capacitance devices and self capacitance devices. Accordingly, the touch unit array provided in the present disclosure is capable to utilize both touch sensing devices with different sensing methods. By the coping with both mutual capacitance devices and self capacitance devices, the touch sensing signals generated by the touching object can be detected regardless the touching object is relatively close to or relatively distant from the touch unit array.

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

What is claimed is:

1. A touch unit array, comprising:
   a plurality of first strip electrodes, wherein each of the first strip electrodes comprises a plurality of first electrode pads, and each of the first electrode pads has a first opening;
   a plurality of second strip electrodes interlaced with the first strip electrodes, wherein each of the second strip electrodes comprises a plurality of second electrode pads, and each of the second electrode pads has a second opening; and
   a plurality of electrode pad units not electrically connected to any of the first strip electrodes or any of the second strip electrodes, wherein the electrode pads are respectively disposed in the plurality of first openings or the second openings, the electrode pads are connected in series in groups of four electrode pads and each group comprises of two electrode pads disposed in the first openings and two electrode pads disposed in the second openings, and each of the electrode pad units receives a first driving signal.

2. The touch unit array of claim 1, wherein the first driving signal comprises a waveform signal, the electrode pad receives a first driving signal, the first strip electrode receives a second driving signal, and the first driving signal and the second driving signal are independent.

3. The touch unit array of claim 2, wherein the waveform signal is a sine wave, a cosine wave, a square wave, a triangular wave, or a sawtooth wave.

4. The touch unit array of claim 1, wherein the extending direction of the first strip electrodes is orthogonal to the extending direction of the second strip electrodes, and the electrode pad units are electrically isolated from the first strip electrodes and the second strip electrodes.

5. The touch unit array of claim 1, wherein the first strip electrodes respectively receives a second driving signal, the second strip electrodes respectively outputs a detecting signal.

6. The touch unit array of claim 1, wherein the first strip electrodes and the second strip electrodes are interlaced to form a plurality of overlapping patterns and a plurality of interspaces.

7. The touch unit array of claim 1, wherein each of the first strip electrodes comprises a plurality of first electrode pad, each of the second strip electrodes comprises a plurality of second electrode pad, and at least one of the first electrode pads has the first opening.

8. The touch unit array of claim 7, wherein the first opening of each of the first strip electrodes is greater than two, each of the second strip electrodes has a plurality of second openings, each of the second electrode pads has the second opening, and the electrode pads are respectively disposed in the first openings and the second openings.

9. The touch unit array of claim 7, further comprising an isolation layer disposed between the first strip electrode and the second strip electrode of the overlapping patterns, the quantity of the first openings is greater than two, each second strip electrode has a plurality of second opening, each second electrode pad has the second opening, and the electrode pads are respectively disposed in the first openings, interspaces, and the second openings.

10. A touch display panel, comprising:
a first substrate;
a pixel array disposed on the first substrate; and
the touch unit array of claim 1 disposed on the pixel array.

11. The touch display panel of claim 10, further comprising:
a display medium;
a color filter array disposed between the touch unit array and the display medium; and
a second substrate disposed between the touch unit array and the color filter array.

12. The touch display panel of claim 10, further comprising:
a display medium;
a second substrate; and
a color filter array disposed between the touch unit array and the display medium, wherein the touch unit array is disposed between the second substrate and the color filter array.

13. The touch display panel of claim 10, further comprising:
a display medium;
a second substrate; and
a color filter array disposed between the second substrate and the touch unit array.

* * * * *